United States Patent
Kim et al.

(10) Patent No.: US 10,356,595 B2
(45) Date of Patent: Jul. 16, 2019

(54) METHOD AND DEVICE FOR NAN TERMINAL TRANSITIONING STATE IN WIRELESS COMMUNICATION SYSTEM

(71) Applicant: LG ELECTRONICS INC., Seoul (KR)

(72) Inventors: Dongcheol Kim, Seoul (KR); Byungjoo Lee, Seoul (KR); Hyunhee Park, Seoul (KR); Giwon Park, Seoul (KR); Taesung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/574,234

(22) PCT Filed: Jun. 7, 2016

(86) PCT No.: PCT/KR2016/005977
§ 371 (c)(1),
(2) Date: Nov. 15, 2017

(87) PCT Pub. No.: WO2016/195448
PCT Pub. Date: Dec. 8, 2016

(65) Prior Publication Data
US 2018/0139600 A1 May 17, 2018

Related U.S. Application Data

(60) Provisional application No. 62/171,244, filed on Jun. 5, 2015.

(51) Int. Cl.
*H04W 8/00* (2009.01)
*H04W 52/02* (2009.01)
(Continued)

(52) U.S. Cl.
CPC ....... *H04W 8/005* (2013.01); *H04W 52/0216* (2013.01); *H04W 56/0015* (2013.01);
(Continued)

(58) Field of Classification Search
CPC ....... H04W 8/00; H04W 8/005; H04W 52/02; H04W 52/0216; H04W 56/00;
(Continued)

(56) References Cited

U.S. PATENT DOCUMENTS 9,554,344 B2 * 1/2017 Huang .................. H04W 48/12
2014/0080481 A1 3/2014 Abraham et al.
(Continued)

OTHER PUBLICATIONS

Daniel Camps-Mur, et al., "Enabling Always on Service Discovery: Will Neighbor Awareness Networking", IEEE Wireless Communications, vol. 22 Issue 2, Apr. 2015.

*Primary Examiner* — Tri H Phan
(74) *Attorney, Agent, or Firm* — Dentons US LLP

(57) ABSTRACT

The present invention relates to a method for a NAN proxy client transitioning a state in a wireless communication system. Here, the method for a NAN proxy client transitioning a state may comprise the steps of: the NAN proxy client transitioning, to a NAN proxy server, a request message requesting the escrowing of a proxy service; receiving a response message from the NAN proxy server; performing registration to the NAN proxy server on the basis of the response message; and the state of the NAN proxy client transitioning. Here, if the registration to the NAN proxy server is performed, the state of the NAN proxy client can be transitioned to a first state.

10 Claims, 15 Drawing Sheets

(51) Int. Cl.
*H04W 56/00* (2009.01)
*H04W 84/20* (2009.01)
*H04W 88/02* (2009.01)

(52) U.S. Cl.
CPC ............ *H04W 84/20* (2013.01); *H04W 88/02* (2013.01); *Y02D 70/126* (2018.01); *Y02D 70/1224* (2018.01); *Y02D 70/1262* (2018.01); *Y02D 70/1264* (2018.01); *Y02D 70/142* (2018.01); *Y02D 70/146* (2018.01); *Y02D 70/22* (2018.01)

(58) Field of Classification Search
CPC . H04W 56/0015; H04W 84/20; H04W 88/02; Y02D 70/126
See application file for complete search history.

(56) References Cited

U.S. PATENT DOCUMENTS

| | | | |
|---|---|---|---|
| 2015/0036540 A1 | 2/2015 | Kasslin et al. | |
| 2015/0098388 A1 | 4/2015 | Fang et al. | |
| 2015/0131529 A1 | 5/2015 | Zhou et al. | |
| 2016/0249409 A1* | 8/2016 | Kim | H04W 76/36 |
| 2016/0270137 A1* | 9/2016 | Yong | H04W 8/005 |
| 2016/0277914 A1* | 9/2016 | Kim | H04W 8/005 |
| 2016/0352782 A1* | 12/2016 | Patil | H04L 65/105 |
| 2016/0352842 A1* | 12/2016 | Patil | H04L 67/16 |
| 2016/0353269 A1* | 12/2016 | Kasslin | H04W 8/005 |
| 2018/0098211 A1* | 4/2018 | Park | H04W 60/00 |

\* cited by examiner (a)

(b)

METHOD AND DEVICE FOR NAN TERMINAL TRANSITIONING STATE IN WIRELESS COMMUNICATION SYSTEM

This application is a 35 U.S.C. § 371 National Stage entry of International Application No. PCT/KR2016/005977 filed on Jun. 7, 2016, and claims priority to U.S. Provisional Application No. 62/171,244 filed on Jun. 5, 2015, all of which are hereby incorporated by reference in their entireties as if fully set forth herein.

TECHNICAL FIELD

The present invention relates to a wireless communication system, and more particularly, to a method for a NAN (neighbor awareness networking) terminal to transit a state in a wireless communication system.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

DISCLOSURE OF THE INVENTION

Technical Tasks

An object of the present specification is to provide a method for a NAN terminal to transit a state in a wireless communication system and an apparatus therefor.

Another object of the present specification is to provide a method for a NAN terminal to transit a state after the NAN terminal is configured as a NAN proxy client.

Another object of the present specification is to provide a method for a NAN terminal to transit a state after the NAN terminal is configured as a NAN proxy server.

The other object of the present invention is to provide a method of transiting a state in consideration of functions of a NAN proxy server and a NAN proxy client.

Technical Solution

According to an aspect of the present specification, provided herein a method of performing a state transition performed by a NAN (neighbor awareness networking) proxy client in a wireless communication system, the method comprising: transmitting a request message, by the NAN proxy client, to a NAN proxy server to depute the NAN proxy server to perform a proxy service; receiving a response message from the NAN proxy server; registering at the NAN proxy server based on the response message; and transiting the state of the NAN proxy client, wherein the state of the NAN proxy client is switched to a first state when the NAN proxy client registers at the NAN proxy server.

According to another aspect of the present specification, provided herein is a neighbor awareness networking (NAN) proxy client performing a state transition in a wireless communication system, comprising: a reception module configured to receive information from an external device; a transmission module configured to transmit information to an external device; and a processor configured to control the reception module and the transmission module, wherein the processor is further configured to: control the transmission module to transmit a request message to a NAN proxy server to depute the NAN proxy server to perform a proxy service, control the reception module to receive a response message from the NAN proxy server, register at the NAN proxy server based on the response message, the processor configured to perform the state transition, wherein the state of the NAN proxy client is switched to a first state when the NAN proxy client registers at the NAN proxy server.

The followings may be commonly applied to the method and NAN device for a state transition in the wireless communication system.

In accordance with an embodiment of the present specification, the first state corresponds to either a non-master non-sync state or a sleep state.

In accordance with an embodiment of the present specification, the NAN proxy cluster and the NAN proxy server belong to the same NAN cluster and wherein NAN terminals belonging to the same NAN cluster operate based on a first discovery window period.

In accordance with an embodiment of the present specification, the NAN proxy client awakes in a first discovery window of the first discovery window period and a predetermined discovery window only when the first state corresponds to the non-master non-sync state.

In accordance with an embodiment of the present specification, the NAN proxy client awakes in a predetermined discovery window only within the first discovery window period when the first state corresponds to the sleep state.

In accordance with an embodiment of the present specification, the state of the NAN proxy client before being registered at the NAN proxy server corresponds to a second state.

In accordance with an embodiment of the present specification, the second state corresponds to one selected from the group consisting of a master state, a non-master sync state, and a non-master non-sync state.

In accordance with an embodiment of the present specification, the NAN proxy client transmits the request message to the NAN proxy server in a manner of containing information on the second state of the NAN proxy client in the request message.

In accordance with an embodiment of the present specification, when the second state corresponds to the master state, if the NAN proxy client registers at the NAN proxy server, the NAN proxy server is switched to the master state.

In accordance with an embodiment of the present specification, the NAN proxy server awakes in every discovery window and transmits a synchronization beacon frame in the every discovery window.

In accordance with an embodiment of the present specification, the NAN proxy server is in either a master state or a non-master sync state.

Advantageous Effects

According to the present specification, it is able to provide a method for a NAN terminal to transit a state in a wireless communication system and an apparatus therefor.

According to the present specification, it is able to provide a method for a NAN terminal to transit a state after the NAN terminal is configured as a NAN proxy client.

According to the present specification, it is able to provide a method for a NAN terminal to transit a state after the NAN terminal is configured as a NAN proxy server.

According to the present specification, it is able to provide a method of transiting a state in consideration of functions of a NAN proxy server and a NAN proxy client.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 8 is a diagram illustrating a discovery window, and the like;

BEST MODE

Mode for Invention

Figure 1:
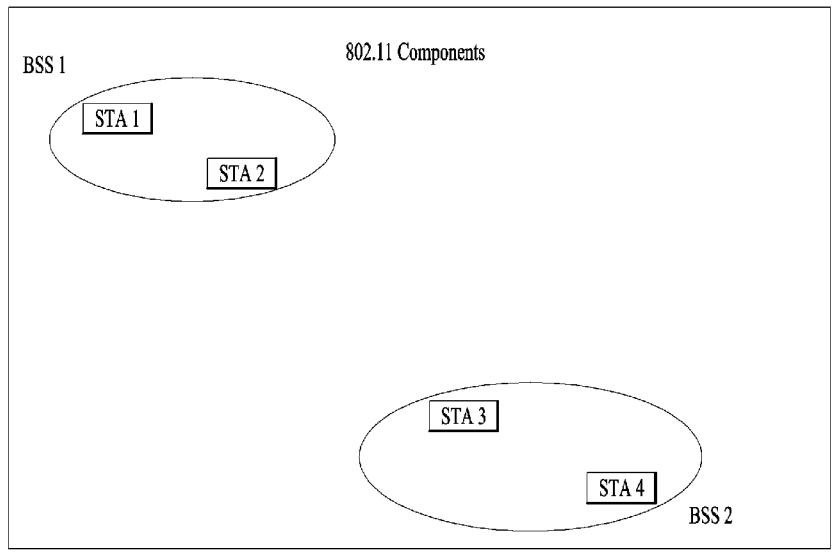
FIG. 1 is a diagram for an example of a structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the abovementioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
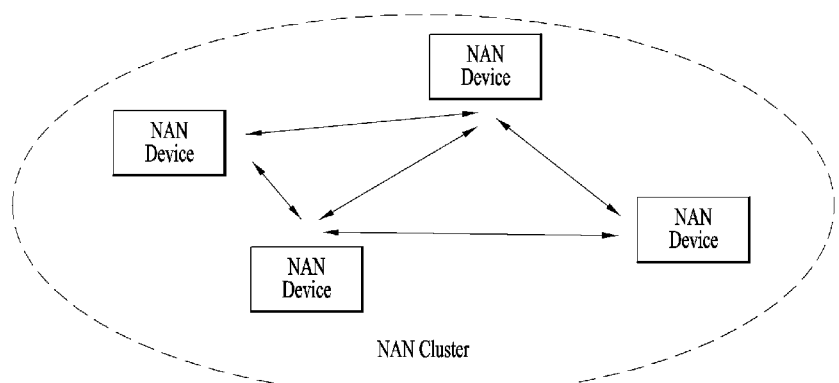
FIGS. 2 to 3 are diagrams for examples of a NAN cluster.
Figure 3:
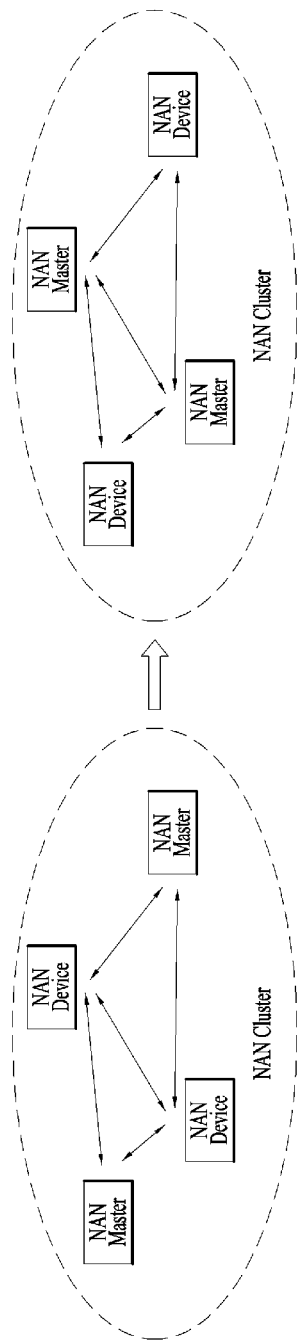

A NAN network can be constructed with NAN devices (devices) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
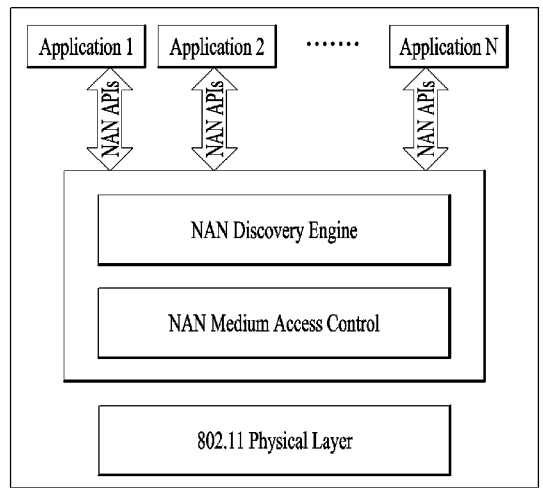
FIG. 4 is a diagram for an example of a structure of a NAN terminal.

FIG. 4 illustrates an example of a structure of a NAN device (device). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, ..., Application N).

Figure 5:
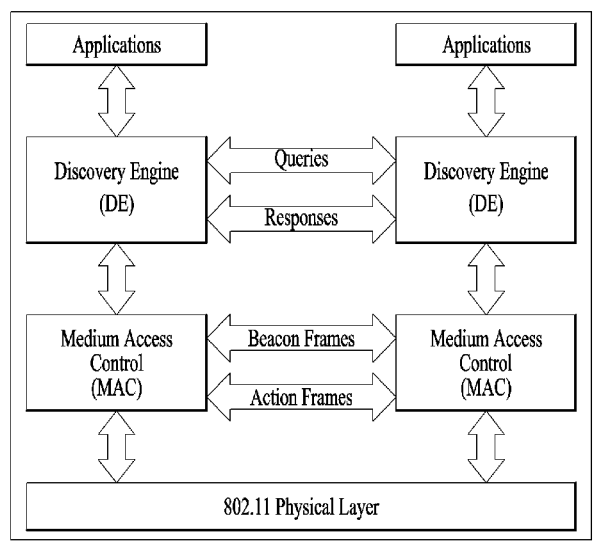
FIGS. 5 to 6 are diagrams illustrating a relation between NAN components.
Figure 6:
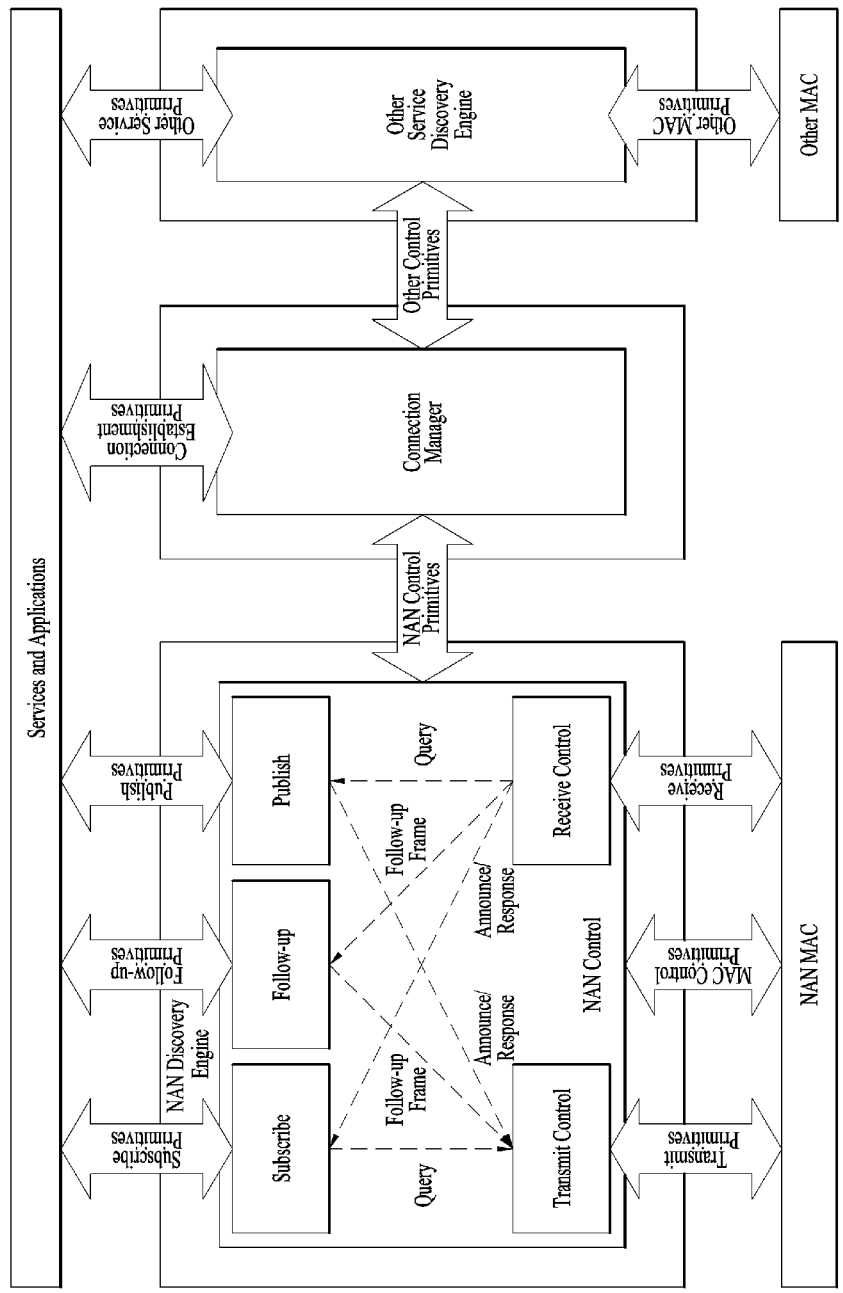

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
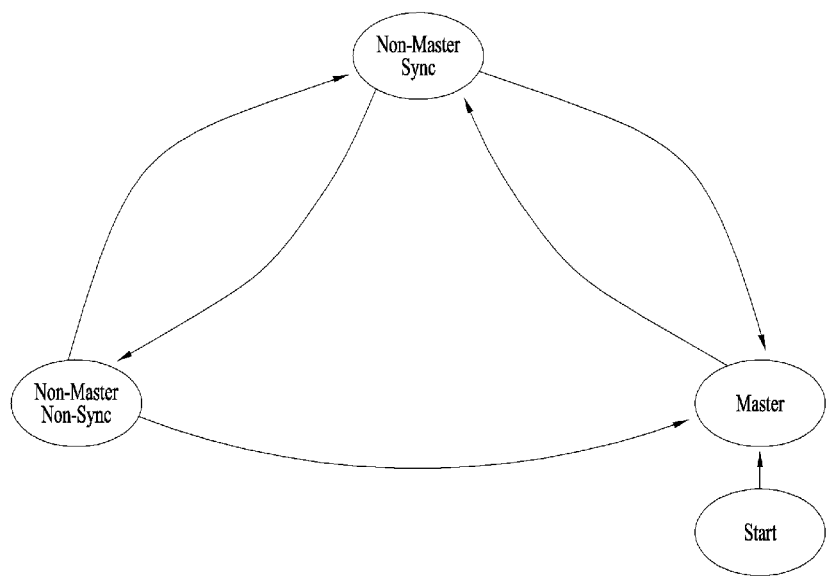
FIG. 7 is a diagram illustrating a state transition of a NAN terminal.

As mentioned in the foregoing description, a NAN device (device) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$MasterRank=MasterPreference*2^{56}+RandomFactor*2^{48}+MAC[5]*2^{40}+ \ldots +MAC[0]$$ [Formula 1]

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master)

set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value—1) and if an AMBTT value is greater than the stored value, the NAN device newly stores the AMBTT value in the beacon frame. If the hop count value in the beacon frame is less than (the stored value—1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (devices) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
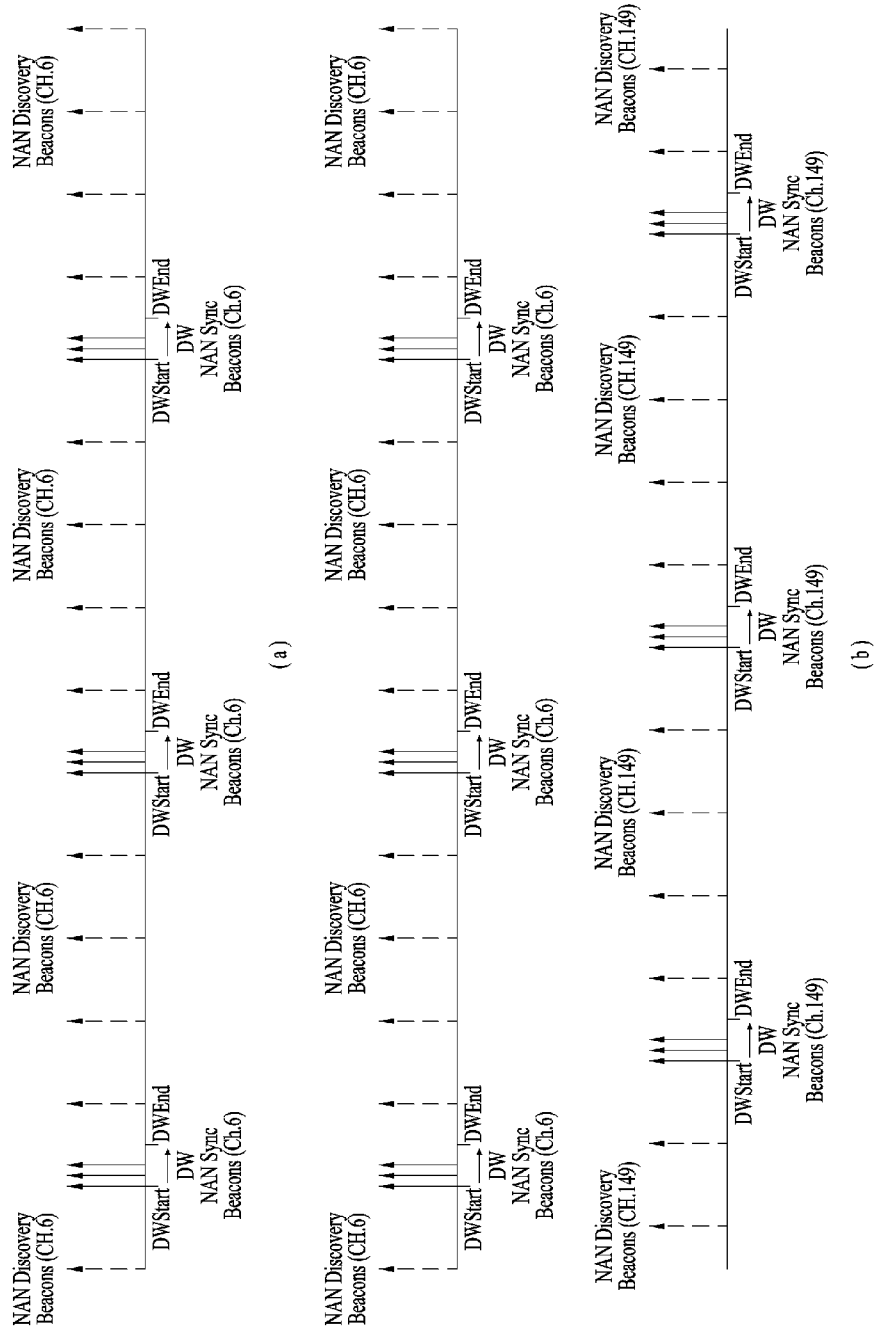

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (*a*) shows transmission of NAN discovery and synchronization beacon frames of a NAN device operating in 2.4 GHz band.

FIG. 8 (b) shows transmission of NAN discovery and synchronization beacon frames of a NAN device operating in 2.4 GHz and 5 GHz bands.

State Transition of NAN Terminal

As mentioned in the foregoing description, a NAN terminal can transit among states such as a non-master non-sync, a non-master sync, a master state, and the like. A state transition can be performed according to a comparison result of RSSI of a synchronization beacon frame, AMR, a hop counter, and the like. In the following description, RSSI_middle may correspond to a value greater than −60 dBm and RSSI_close may correspond to a value less than the RSSI_middle among values greater than −75 dBm.

A state transition from a master state to a non-master sync state may occur in the following cases. First of all, if a synchronization beacon frame of RSSI greater than the RSSI_close is received and a master rank of a device, which has transmitted the synchronization beacon frame, is greater than a master rank of a reception terminal, a state transition may occur. Secondly, if RSSI greater than the RSSI_middle is received from three or more NAN devices and a master rank is greater than a master rank of a reception terminal, a state transition may occur.

A state transition from a non-master state to a master state may occur in the following cases. First of all, if a NAN terminal fails to receive a synchronization beacon frame of RSSI greater than a first value in a NAN cluster and a master rank of a device, which has transmitted the synchronization beacon frame, is greater than a master rank of the terminal, a state transition may occur. Secondly, if a NAN terminal receives a synchronization beacon frame of RSSI greater than a second value (RSSI_middle) from three or less NAN terminals and a master rank of the three or less NAN terminals is greater than a master rank of a reception terminal, a state transition may occur.

A state transition from a non-master sync state to a non-master non-sync state may occur in the following cases. First of all, if a synchronization beacon frame of RSSI greater than the RSSI_close is received, AMR of the synchronization frame is identical to AMR of a NAN device, and a hop count of a device, which has transmitted the synchronization beacon frame, is smaller than a hop count of the NAN device, a state transition may occur. Secondly, if a synchronization beacon frame of RSSI greater than the RSSI_close is received, AMR of the synchronization frame is identical to AMR of a NAN device, and a hop count is the same, and MR of a device, which has transmitted the synchronization beacon frame, is greater than MR of the NAN terminal, a state transition may occur. Thirdly, if a synchronization beacon frame of RSSI greater than RSSI_middle is received from three or more NAN devices, AMR of the synchronization beacon frame is identical to AMR of a NAN terminal, and a hop count of the device, which has transmitted the synchronization beacon frame, is less than a hop count of the NAN device, a state transition may occur. Fourthly, if a synchronization beacon frame of RSSI greater than the RSSI_middle is received from three or more NAN devices, AMR of the synchronization beacon frame is identical to AMR of a NAN terminal, a hop count is the same, and ME of a device, which has transmitted the synchronization beacon frame, is greater than MR of the NAN terminal, a state transition may occur.

A state transition from a non-master non-sync state to a non-master sync state may occur in the following cases. First of all, if a synchronization beacon frame of RSSI greater than the RSS_close is not received, AMR of the synchronization beacon frame is identical to AMR of a NAN terminal, and a hop counter of the synchronization beacon frame is smaller than a hop counter of the NAN terminal, a state transition may occur at the end of a DW. Secondly, if a synchronization beacon frame of RSSI greater than the RSS_close is not received, AMR of the synchronization beacon frame is identical to AMR of a NAN terminal, a hop counter is the same, MR of a device, which has transmitted the synchronization beacon frame, is greater than MR of the NAN terminal, a state transition may occur at the end of a DW. Thirdly, if a synchronization beacon frame of RSSI greater than the RSSI_middle is received from three or less NAN terminals, AMR of the synchronization beacon frame is identical to AMR of a NAN terminal, and a hop count of the synchronization beacon frame is smaller than a hop count of the NAN terminal, a state transition may occur at the end of a DW. Fourthly, if a synchronization beacon frame of RSSI greater than the RSSI_middle is received from three or less NAN terminals, AMR of the synchronization beacon frame is identical to AMR of a NAN terminal, and a hop count is the same, and MR of a device, which has transmitted the synchronization beacon frame, is greater than MR of the NAN terminal, a state transition may occur at the end of a DW.

Figure 9:
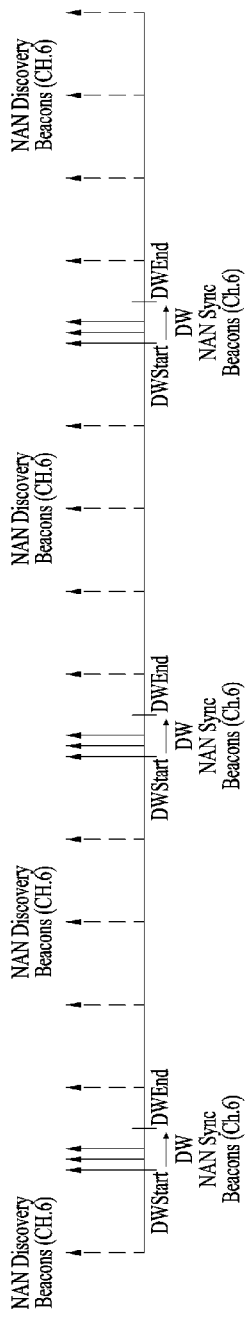
FIG. 9 is a diagram illustrating a discovery window.

FIG. 9 is a diagram illustrating a discovery window. As mentioned in the foregoing description, each NAN terminal performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16 TUs. In particular, the discovery window can last during 16 TUs. In this case, for example, all NAN terminals belonging to a NAN cluster may awake at every discovery window to receive a synchronization beacon frame from a master NAN terminal. By doing so, the NAN cluster can be maintained. In this case, if all NAN terminals awake at every discovery window in a fixed manner, power consumption of the terminals may get worse. Hence, it is necessary to have a method of reducing power consumption by dynamically controlling duration of a discovery window while synchronization is maintained in a NAN cluster.

For example, as mentioned in the foregoing description, a NAN terminal may operate in 2.4 GHz band or 5 GHz band. As a different example, a NAN terminal may operate in sub 1 GHz band. For example, a NAN terminal can be configured to support IEEE 802.11ah that supports sub 1 GHz band. For example, if a NAN terminal supports 900 MHz, it may have link quality and a physical model different from link quality and a physical model in 2.4 GHz or 5 GHz.

For example, if a NAN terminal supports 900 MHz, the NAN terminal can send a signal farther and perform communication in a wider range. In this case, data communication can be performed between NAN terminals and data can be exchanged between NAN terminals. In this case, since the data exchange is performed based on the data communication, a problem may exist in efficiently managing power in the NAN terminal. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN terminal supporting 900 MHz band.

Figure 10:
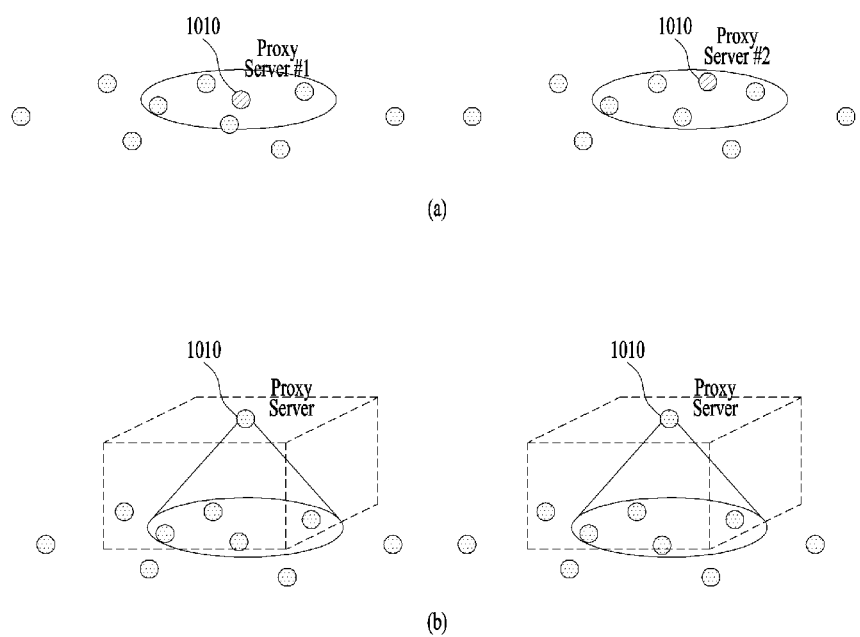
FIG. 10 is a diagram illustrating a method for a NAN terminal to operate based on functions of a proxy server and a proxy client.

FIG. 10 is a diagram illustrating a method for a NAN terminal to operate based on functions of a proxy server and a proxy client.

As mentioned in the foregoing description, NAN terminals can perform data communication. A NAN terminal can receive a frame in a manner of being awaken in a discovery window. In this case, if the NAN terminal performs a procedure for performing data communication in a manner of being awaken in all discovery windows, considerable amount of power can be consumed.

Hence, in the following, a method of reducing power consumption of a NAN terminal is explained. For example, a NAN proxy terminal can be defined as a new role (concept) of the NAN terminal. For example, the NAN proxy terminal may correspond to a NAN proxy server or a NAN proxy client. In this case, the NAN proxy server can perform a procedure for performing data communication on behalf of the NAN proxy client. For example, the NAN proxy server can perform publish and/or subscribe on behalf of the NAN proxy client. More specifically, the NAN proxy server can provide information, which is provided to perform data communication with a different NAN terminal, to other NAN terminals on behalf of the NAN proxy client. In particular, the NAN proxy server can perform the procedure for performing data communication on behalf of the NAN proxy client to reduce power consumption of the NAN proxy client.

For example, the NAN proxy server may correspond to a terminal not sensitive to power consumption. And, the NAN proxy client may correspond to a terminal operating based on low power. In this situation, similar to a legacy NAN terminal, if the NAN proxy client awakes in every discovery window, since the NAN proxy client consumes a considerable amount of power, it may be difficult to use the NAN proxy client. Hence, it may make a terminal not sensitive to power consumption perform a procedure for performing data communication on behalf of the NAN proxy client to reduce power consumption and efficiently perform the data communication.

In this case, in order for the NAN proxy server to perform the procedure for performing the data communication on behalf of the NAN proxy client, it is necessary for the NAN proxy server to obtain information on the NAN proxy client. To this end, the NAN proxy client can be registered at the NAN proxy server. In the following, a method of registering the NAN proxy client at the NAN proxy server is described.

More specifically, a NAN terminal playing a role of a proxy server may correspond to a NAN proxy server. In this case, for example, the NAN proxy server can provide other NAN terminals with information indicating that the NAN proxy server is able to operate as a NAN proxy server. For example, the NAN proxy server can include information on a NAN proxy server role in a broadcasted message. In this case, other NAN terminals can identify the NAN proxy server based on the broadcasted message. And, for example, the NAN proxy server can provide other NAN terminals with the information on the NAN proxy server role using a publish message, by which the present invention may be non-limited.

In this case, referring to FIG. 10a, a NAN proxy server 1010 and NAN proxy clients can be spatially positioned at the same plane. In this case, as mentioned in the foregoing description, the NAN proxy server 1010 may correspond to a terminal or a device not sensitive to power consumption. Yet, if the NAN proxy server 1010 and the NAN proxy clients are spatially positioned at the same plane, since the NAN proxy server may experience considerable radio wave interference by a different NAN terminal or an obstacle, it may be difficult to efficiently manage the NAN proxy clients.

On the contrary, referring to FIG. 10b, the NAN proxy server 1010 can be spatially positioned at the top of the NAN proxy clients. In this case, as mentioned in the foregoing description, the NAN proxy server 1010 may correspond to a terminal or a device not sensitive to power consumption. In this case, if the NAN proxy server 1010 is spatially positioned at the top of the NAN proxy clients, the NAN proxy server may easily exchange a signal with the NAN proxy clients. In particular, the NAN proxy server 1010 and the NAN proxy clients may experience less radio wave interference due to an obstacle.

Hence, it is necessary for the NAN proxy server 1010 performing a proxy server function to be spatially positioned at the top of other terminals to more efficiently perform the proxy server function. And, if the NAN proxy server 1010 corresponds to a terminal or a device not sensitive to power consumption, the NAN proxy server 1010 can more efficiently perform the proxy server function. However, If NAN terminals are configured to perform a proxy server/client function, the NAN terminals may become a NAN proxy server or a NAN proxy client, by which the present invention may be non-limited.

Figure 11:
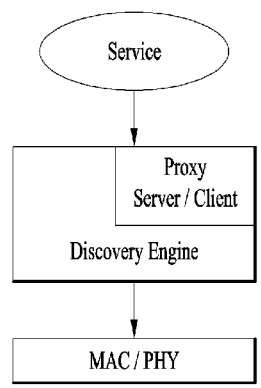
FIG. 11 is a diagram illustrating an operation method of a NAN terminal performing a function of a NAN proxy server or a NAN proxy client.
Figure 11:
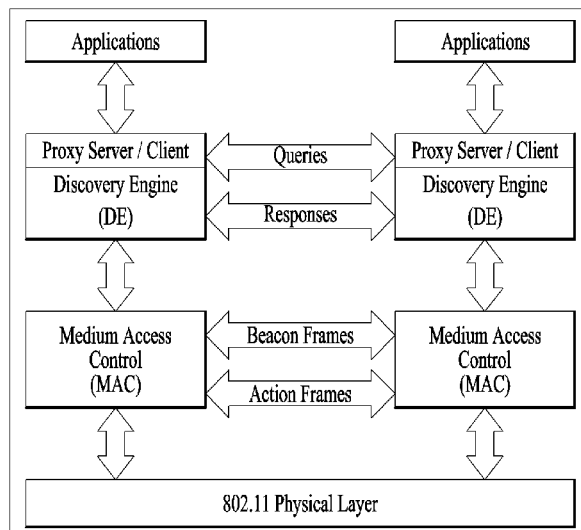

FIG. 11 is a diagram illustrating an operation method of a NAN terminal performing a function of a NAN proxy server or a NAN proxy client.

As mentioned earlier in FIG. 4, a NAN terminal may operate with a layer structure. In this case, a NAN discovery engine can provide functions including a subscribe function, a publish function, and a follow-up function. The publish/subscribe function may operate via a service interface provided by a service/application. If a publish/subscribe command is executed, an instance of the publish/subscribe function can be generated. In this case, each instance is independently executed. Depending on implementation, a plurality of instances can be executed at the same time. The follow-up function may correspond to a means for a service/application that transmits and receives service specific information.

Referring to FIGS. 11a and 11b, a proxy server/proxy client function can be provided based on a NAN discovery engine. In this case, as mentioned in the foregoing description, the NAN discovery engine calls a subscribe method, a publish method, and a follow-up methods to exchange information with a service/application layer. In this case, it may be able to define a proxy parameter as a parameter for the method. In this case, the proxy parameter can be configured by a combination shown in Table 3 in the following. And, the proxy parameter may correspond to a parameter defined to exchange information between the NAN discovery engine and the service/application layer in relation to the proxy server/client function, by which the present invention may be non-limited.

TABLE 3

| Proxy parameters |
|---|
| TTL (Time To Live) |
| Stop Trigger Condition |

And, it may be able to define "Service_Status_Update (instance_id, state)" as a new method in relation to a proxy server/client function of a NAN terminal. In this case, a NAN proxy client can use the "Service_Status_Update (instance_id, state)" to update information on a service change for a NAN proxy server. In this case, the information on the service change can be transmitted in a discovery window period using a service discovery frame. And, the information on the service change can be transmitted in a separate period (e.g., FAW (further available window)) using a separate frame, by which the present invention may be non-limited. In this case, for example, the NAN proxy server calls the "Service_Status_Update(instance_id, state)" as a method to update information on a changed service.

Figure 12:
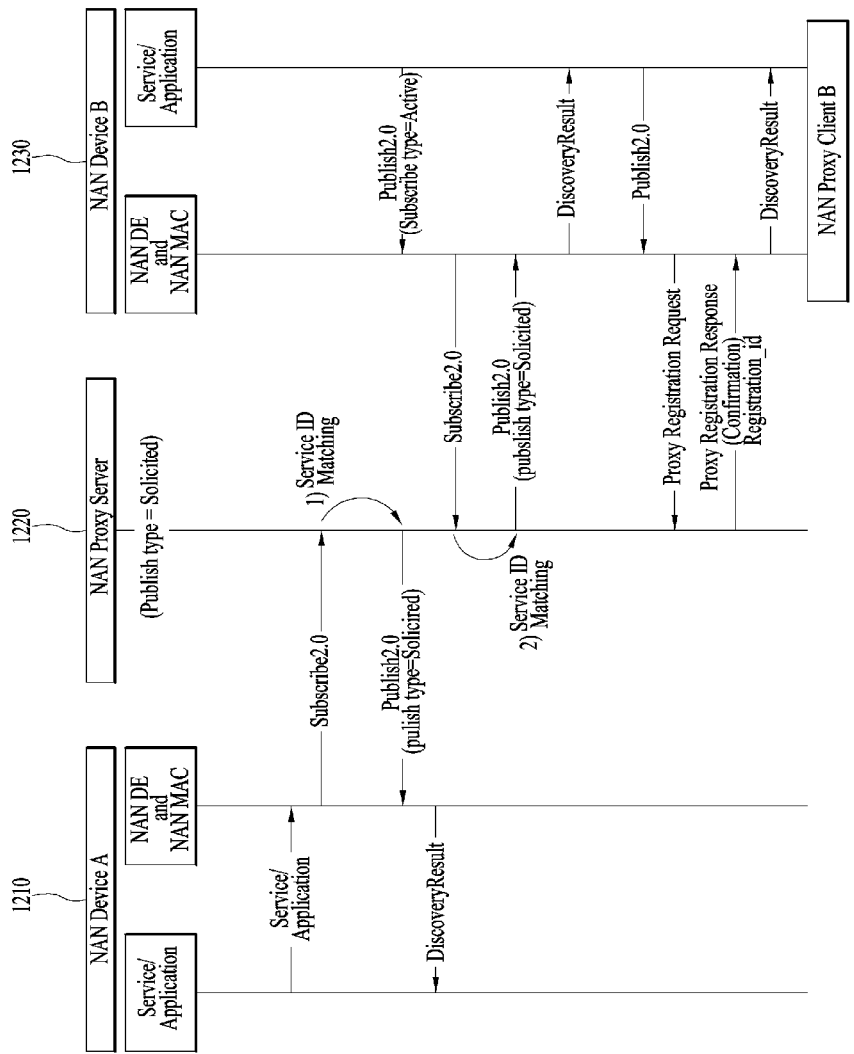
FIG. 12 is a diagram illustrating a method for a NAN terminal to register at a NAN proxy server as a NAN proxy client.

FIG. 12 is a diagram illustrating a method for a NAN terminal to register at a NAN proxy server as a NAN proxy client.

A NAN terminal can perform a function of a proxy server or a proxy client. In this case, a NAN terminal performing a function of a proxy server may correspond to a NAN proxy server. And, a NAN terminal performing a function of a proxy client may correspond to a NAN proxy client. In particular, the NAN terminal may operate as a NAN proxy server or a NAN proxy client.

In this case, for example, in order for the NAN proxy server or the NAN proxy client operate, it may be necessary for the NAN proxy client to register at the NAN proxy server first. And, it is necessary for the NAN proxy server to perform a proxy server function before the NAN proxy client registers at the NAN proxy server.

In this case, for example, if a user selects a proxy server service to be started, a NAN terminal may operate as a NAN proxy server or a NAN proxy client. In this case, for example, a service name for a service operating as a NAN proxy server can be configured by "org.wi-fi.nan.proxy-.server" or "org.wi-fi.nan.proxy_server". And, for example, a service name for a service operating as a NAN proxy client can be configured by "org.wi-fi.nan.proxy.client" or "org.wi-fi.nan.proxy_client". In particular, if a user selects a corresponding service, a proxy server function or a proxy client function can be performed in a NAN terminal.

As a different example, among NAN terminals, a terminal having a NAN proxy server function can automatically operate as a NAN proxy server. And, for example, among NAN terminals, a terminal having a NAN proxy server function can operate as a NAN proxy server when a prescribed condition is satisfied.

As a further different example, among NAN terminals, a terminal having a NAN proxy server function may start a service of a NAN proxy server by informing a different terminal of information on proxy server capability.

In this case, for example, in order for a NAN proxy server to perform a function of a NAN proxy client on behalf of the NAN proxy client, it is necessary to register the NAN proxy client at the NAN proxy server. More specifically, a NAN terminal provides information on a service to be deputed to the NAN proxy server and the NAN terminal may become the NAN proxy client based on the information.

For example, referring to FIG. 12, if NAN terminals 1210/1230 recognize the NAN proxy server, the NAN terminals 1210/1230 can transmit a subscribe message to the NAN proxy server 1220 to find out a service of the NAN proxy server 1220.

More specifically, as mentioned in the foregoing description, the NAN terminals 1210/1230 may have a layered structure. In this case, for example, a service/application layer of a first NAN terminal (NAN device A, 1210) can provide a discovery engine (DE) and NAN MAC of the first NAN terminal 1210 with a subscribe method.

In this case, for example, primitives of the subscribe method provided to the NAN DE and the NAN MAC layers by the service/application layer can be represented as Table 4 in the following. In particular, the service/application layer can provide information on Table 4 to the NAN DE and the NAN MAC layers. More specifically, the service/application layer can provide information on a service name, service specific information, and a configuration parameter to be searched by a NAN terminal to the NAN DE and the NAN MAC layers.

And, other additional information can also be included in the primitives of the subscribe method, by which the present invention may be non-limited.

TABLE 4

Subscribe(service_name, service_specific_info, configuration_parameters)

service_name:
    UTF-8 name string which identifies the service/application
service_specific_info:
    Sequence of values which further specify the published service beyond the service name
configuration_parameters
    Subscribe type
        Active
    Query period
        Recommended periodicity of query transmissions
    Time to live
    The instance of the Subscribe function can be commanded to run for a given time interval or until the first DiscoveryResult event Subsequently, the first NAN terminal 1210 can transmit a subscribe message to the NAN proxy server 1220. In particular, the first NAN terminal 1210 can transmit the subscribe message to the NAN proxy server 1220 based on the subscribe method as an active subscribe.

Subsequently, when the NA proxy server 1220 replies to the subscribe message, the NAN proxy server 1220 can transmit a publish message to the first NAN terminal 1210 by matching a service ID with a service capable of being provided by the NAN proxy server 1220. In this case, a Publish Type of the publish message may correspond to Solicited.

In this case, for example, the service/application layer of the NAN proxy server 1220 can provide a publish method to the NAN DE and NAN MAC layers of the NAN proxy server 1220. In this case, for example, primitives of the publish method can be represented as follows.

In particular, the service/application layer can provide information on Table 5 to the NAN DE and the NAN MAC layers. More specifically, the service/application layer can provide information on a service name, service specific information, and a configuration parameter supported by the NAN proxy server 1220 to the NAN DE and the NAN MAC layers.

In this case, Publish type information can be included in configuration information to indicate that solicited transmission is performed. And, Solicited transmission type information can also be included in the configuration information to indicate whether or not the solicited transmission corresponds to unicast transmission or broadcast transmission. And, Time to live information can be included in the configuration information as information on time during which a publish function is performed. And, Event conditions information can be included in the configuration information to indicate whether or not an event is generated.

And, other additional information can also be included in the primitives of the publish method, by which the present invention may be non-limited.

TABLE 5

Publish(service_name, service_specific_info,
configuration_parameters)

service_name:
    UTF-8 name string which identifies the service/application
service_specific_info:
    Sequence of values which should be conveyed to the Discovery
Engine of a NAN Device that has invoked a Subscribe method
corresponding to this Publish method.
    configuration_parameters
        Publish type:
            Solicited transmissions only
        Solicited transmission type:
            Determines whether a solicited transmission is a
unicast or a broadcast transmission
        Time to live:
            The instance of the Publish function can be
commanded to run for a given time interval or for one transmission only
        Event conditions:
            Determines when Publish related events are generated.
Events can be requested to be generated on each solicited transmission.
Alternatively, no events are expected.

Subsequently, if the first NAN terminal 1210 receives a publish message, the NAN DE and the NAN MAC layers of the first NAN terminal 1210 can provide a discovery result as an event to the service/application layer of the first NAN terminal 1210. By doing so, the first NAN terminal 1210 can complete the service discovery of the NAN proxy server 1220.

In this case, for example, primitives of the discovery result event can be represented as Table 6 in the following.

More specifically, the NAN DE and the NAN MAC layers can provide the service/application layer with the discovery result event including subscribe id information that identifies a subscribe function, service_specific_info information corresponding to specific service information supported by the NAN proxy server, publish_id information corresponding to publish ID information, and Address information corresponding to address information of the proxy server.

And, other additional information can also be included in the primitives of the discovery result event, by which the present invention may be non-limited.

TABLE 6

DiscoveryResult(subscribe_id, service_specific_info,
publish_id, address)

subscribe_id:
    As originally returned by the instance of the Subscribe function
service_specific_info:
    Sequence of values which were decoded from a frame received
from the Proxy server
publish_id:
    Identifier for the instance of the published service on a remote
Proxy server
Address:
    NAN Interface Address of the Proxy Server And, the second NAN terminal (NAN device B, 1230) can discover a service of the NAN proxy server 1220 based on a method identical to the method of the first NAN terminal 1010. In this case, for example, the service discovery on the NAN proxy server 1220 can be individually performed by each of the NAN terminals 1210/1230.

In this case, for example, having completed the service discovery on the NAN proxy server 1220, a service/application layer of the second NAN terminal 1230 can provide a publish method to NAN DE and NAN MAC layers of the second NAN terminal 1230.

In this case, for example, primitives used for the second NAN terminal 1230 to register at the NAN proxy server can be defined as Table 7 and Table 8 in the following. More specifically, the service/application layer of the second NAN terminal 1230 can provide information on proxy registration to the NAN DE and the NAN MAC layers of the second NAN terminal 1230 according to Table 7 and Table 8 as a publish method. In particular, the second NAN terminal 1230 can provide the information on the proxy registration to the NAN DE and the NAN MAC layers of the second NAN terminal 1230 by reusing a legacy publish method and a subscribe method. In this case, for example, when the legacy publish method and the subscribe method are reused, information for registering at the proxy server rather than information of the second NAN terminal for publishing the second NAN terminal 1230 can be included in a service_specific_info field. In particular, the second NAN terminal 1230 may use a method of including the information on the registration by using the legacy publish method and the subscribe method formats as it is.

TABLE 7

Publish (service_name, service_specific_info,
configuration_parameters)

service_name:
    UTF-8 name string which identifies the service/application
service_specific_info:
    Sequence of values which should be conveyed to the Discovery
Engine of a NAN Device that has invoked a Subscribe method
corresponding to this Publish method.
    configuration_parameters
        Publish type:
            Solicited transmissions only and Unsolicited
            transmission only
        Solicited transmission type:
            Determines whether a solicited transmission is a
unicast or a broadcast transmission
        Announcement period:
            Recommended periodicity of unsolicited transmissions
        Time to live:
            The instance of the Publish function can be
commanded to run for a given time interval or for one transmission only
        Event conditions:
            Determines when Publish related events are generated.
Events can be requested to be generated on each solicited transmission.
Alternatively, no events are expected.

TABLE 8

Subscribe (service_name, service_specific_info,
configuration_parameters)

service_name:
    UTF-8 name string which identifies the service/application
service_specific_info:
    Sequence of values which should be conveyed to the Discovery
Engine of a NAN Device that has invoked a Subscribe method
corresponding to this Publish method.
    configuration_parameters
        Subscribe type:
            Determines the type of Subscribe as follows
                Passive: NAN device can passively subscribe to
                      internal NAN DE.
                Active: NAN device can actively subscribe to
                      proxy server.
        Discovery range:
            Determines whether the service is searched in close
proximity only or in any NAN Devices within range
        Query period:
            Recommended periodicity of Query transmissions TABLE 8-continued Subscribe (service_name, service_specific_info, configuration_parameters)

Time to live:
    The instance of the Subscribe function can be commanded to run for a given time interval or until the first DiscoveryResult eventRecommended periodicity of unsolicited transmissions As a different example, the second NAN terminal 1230 can newly define and use primitives for a method called for registration. In particular, the service/application layer of the second NAN terminal 1230 can provide information on proxy registration by providing a newly defined proxy registration method to the NAN DE and the NAN MAC layers of the second NAN terminal 1230. In this case, primitives of the newly defined proxy registration method can be represented as Table 9 in the following.

TABLE 9

ProxyRegistartion(service_name, service_specific_info, configuration_parameters)

service_name:
    UTF-8 name string which identifies the service/application
service_specific_info:
    Sequence of values which should be conveyed to the Discovery Engine of a NAN Device that has invoked a Subscribe method corresponding to this ProxyRegistration method.
    configuration_parameters
        ProxyRegistration type:
            Solicited transmissions only and Unsolicited transmission
        Solicited transmission type:
            Determines whether a solicited transmission is a unicast or a broadcast transmission
        Announcement period:
            Recommended periodicity of unsolicited transmissions
        Time to live:
            The instance of the Publish function can be commanded to run for a given time interval or for one transmission only
        Event conditions:
            Determines when ProxyRegistration related events are generated. Events can be requested to be generated on each solicited transmission. Alternatively, no events are expected.

In particular, the service/application layer of the second NAN terminal 1230 can provide a method for registering at the NAN proxy server to the NAN DE and the NAN MAC. In this case, the method may correspond to a method using a legacy publish method format and the method including information on proxy registration. And, for example, the method may correspond to a method newly defined for proxy registration, by which the present invention may be non-limited.

Subsequently, the NAN DE and the NAN MAC layers of the second NAN terminal 1230 can transmit a proxy registration request to the NAN proxy server 1220. In this case, the proxy registration request may correspond to a publish message. For example, the proxy registration request may correspond to a publish type as a service discovery frame. In this case, a service discovery attribute for the proxy registration request can be represented as Table 10 in the following.

TABLE 10

| Field | Size (Octets) | Value (Hex) | Description |
| --- | --- | --- | --- |
| Attribute ID | 1 | 0x03 | Identifies the type of NAN attribute |
| Length | 2 | Variable | Length of the following fields in the attribute. |
| Service ID* | 6 | Variable | Mandatory field that contains the hash of the Service Name. |
| Instance ID | 1 | Variable | Publish_ID or Subscribe_ID |
| Requestor Instance ID | 1 | Variable | Instance ID from the frame that triggered the transmission if available, otherwise set to 0x00. |
| Service Control | 1 | Variable | Mandatory field that defines the Service Control bitmap |
| Binding Bitmap | 0 or 2 | 0x0000 to0xFFFF | Optional field that indicates the binding of the SDA to post discovery connection attributes |
| Service Response Filter Length | 0 or 1 | Variable | An optional field and present if a service response filter is used. |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

In this case, for example, a service ID field can be mandatorily included in fields described in the following included in the proxy registration request. In this case, the service ID field can be defined by a proxy service ID corresponding to a service provided by the NAN proxy server. And, a proxy registration request field can include information necessary for a NAN terminal to register at the NAN proxy server. In this case, for example, a service info field corresponding to a field included in the proxy registration request can include a proxy request TLV (proxy registration request TLV). In this case, the proxy request TLV can be represented as Table 11 in the following. In this case, for example, the proxy request TLV can include an availability time field indicating DW duration during which a NAN terminal awakes after being registered as a proxy client. And, the proxy request TLV can also include a service ID field corresponding to an ID of a service requested by the NAN terminal to the NAN proxy server. Besides, the proxy request TLV can also include information necessary for the NAN terminal to register at the NAN proxy server, by which the present invention may be non-limited.

TABLE 11

| Field | Size (Octets) | Value (Hex) | Description |
| --- | --- | --- | --- |
| Type | 1 | Variable | Type code of the Proxy Registration Request TLV |
| Length | 2 | Variable | Length of the Proxy Registration Request TLV (not including the Type and Length fields) |

TABLE 11-continued

| Field | Size (Octets) | Value (Hex) | Description |
|---|---|---|---|
| Availability Time | 1 | Variable | Indicates bitmap for the DW Awake Duration of Proxy Client (DW could be presented from DW0 to DW15 with bitmap pattern) If bitmap bit is set as 0, Proxy Client is sleep, otherwise bitmap bit is set as 1, Proxy Client is awake, e.g., when DW awake duration is DW1 and DW2, bitmap is presented as 0110000000000000. |
| Time to live | 1 | Variable | Indicates TTL of Proxy client's service |
| Service ID | 6 | Variable | Indicates the requesting service ID |
| Instance ID | 1 | Variable | Publish_ID or Subscribe_ID |
| Requestor Instance ID | 1 | Variable | Instance ID from the frame that triggered the transmission if available, otherwise set to 0x00 |
| Service Control | 1 | Variable | Mandatory field that defines the Service Control bitmap |
| Binding Bitmap | 0 or 2 | 0x0000 to 0xFFFF | Optional field that indicates the binding of the SDA to post discovery connection attributes |
| Service Response Filter Length | 0 or 1 | Variable | An optional field and present if a service response filter is used |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

Subsequently, the NAN proxy server can transmit a proxy response to the second NAN terminal 1230 in response to the proxy request. In this case, for example, the proxy response may correspond to a publish message. For example, the proxy registration response corresponds to a service discovery frame having a publish type. In this case, for example, a service discovery attribute for the proxy registration response can be represented as the aforementioned Table 10.

In this case, for example, a service ID field may correspond to a field mandatorily included in the fields described in the following included in the proxy registration response. In this case, the service ID field can be defined by a proxy service ID corresponding to a service provided by the NAN proxy server. The proxy registration response field can also include information necessary for a NAN terminal to register at the NAN proxy server. In this case, a service info field corresponding to a field included in the proxy registration response can include a proxy response TLV (proxy registration response TLV). In this case, the proxy response TLV can be represented as Table 12 in the following. In this case, for example, the proxy response TLV can include a status indication field indicating whether or not the NAN proxy server permits the registration of a NAN terminal. In this case, for example, if the status indication field corresponds to 0, it may indicate that the NAN proxy server permits the registration of the NAN terminal. And, if the status indication field corresponds to 1 or 2, it may indicate that the registration is denied base on a different reason. And, for example, the proxy response TLV can include a registration ID field indicating a registration ID. And, the proxy response TLV can include a service ID field corresponding to an ID of a service provided by the NAN proxy server. Besides, the NAN proxy response TLV can include information necessary for a NAN terminal to register at the NAN proxy server, by which the present invention may be non-limited.

TABLE 12

| Field | Size (Octets) | Value (Hex) | Description |
|---|---|---|---|
| Type | 1 | Variable | Type code of the Proxy Registration Response TLV |
| Length | 2 | Variable | Length of the Proxy Registration Response TLV (not including the Type and Length fields) |
| Status indication | 1 | Variable | If set to 0, Proxy registration is accept, otherwise set to 1 is fail due to requested information not available, and set to 2 is fail due to bad request |
| Registration ID | 1 | Variable | Indicates the Registration ID of requested service |
| MAC Address of matched device | 6 | Variable | Indicates the MAC Address of service matched device on a remote NAN Device |
| Service ID | 6 | Variable | Responses the requesting service ID |
| Time to live | 1 | Variable | Indicates TTL of Proxy Server |
| Watchdog timer | 1 | Variable | Indicates Watchdog timer value |

Subsequently, if the NAN DE and the NAN MAC of the second NAN terminal 1230 receive a confirmation from the NAN proxy server, the NAN DE and the NAN MAC of the second NAN terminal 1230 can provide a discovery result event to the service/application layer. In this case, for example, if a proxy response of which the status indication field corresponds to 1 is received, it may indicate that a confirmation is completed. Subsequently, the second NAN terminal 1230 may become a NAN proxy client registered at the NAN proxy server based on the discovery result event.

A NAN terminal may become a NAN proxy client registered at the NAN proxy server via the aforementioned procedure.

Figure 13:
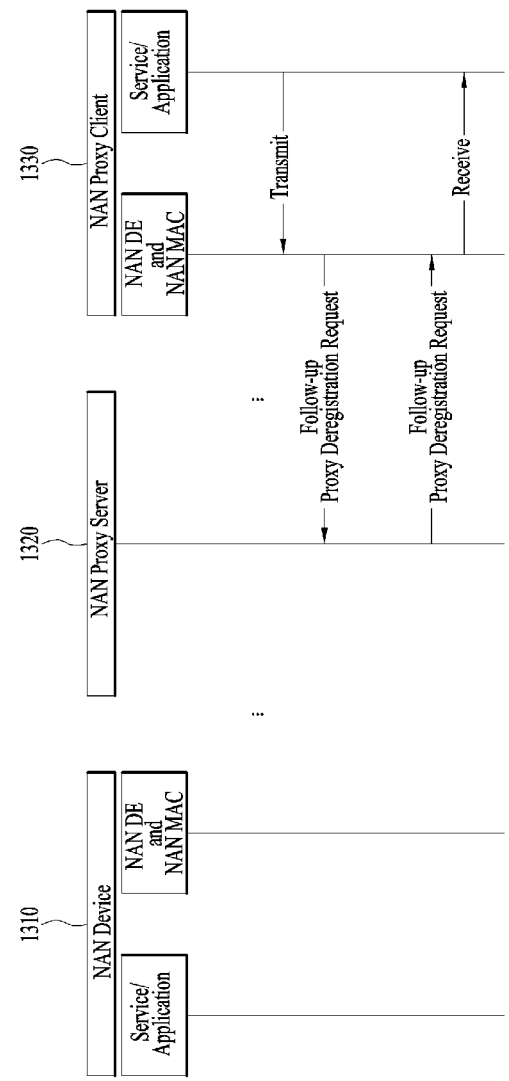
FIG. 13 is a diagram illustrating a method for a NAN proxy client registered at a NAN proxy server to release the registration.

FIG. 13 is a diagram illustrating a method for a NAN proxy client registered at a NAN proxy server to release the registration.

A NAN proxy client can maintain a state that the NAN proxy client is registered at a NAN proxy server. In this case, for example, the NAN proxy client can release the registration registered at the NAN proxy server. For example, the NAN proxy client can release the registration from the NAN proxy server based on a distance problem or a power consumption problem.

And, for example, if the NAN proxy server receives a response message from the NAN proxy client after a result value for a service deputed by the NAN proxy client is transmitted to the NAN client, the NAN proxy client can release the registration from the NAN proxy server.

And, for example, if the NAN proxy client transmits a proxy service termination request message for a service deputed to the NAN proxy server, the NAN proxy client can release the registration from the NAN proxy server.

And, for example, if the NAN proxy server receives update information on a service, which is performed by the NAN proxy server on behalf of the NAN proxy client, the NAN proxy server can control an operation of the service performed by the NAN proxy server on behalf of the NAN proxy client.

More specifically, if the NAN proxy server receives TTL information from the NAN proxy client, the NAN proxy server can extend or reduce duration for which the service is performed based on the TTL information.

As a different example, if the NAN proxy server receives information on a service status from the NAN proxy client, the NAN proxy server can determine whether to perform the service on behalf of the NAN proxy client based on the information on the service status. For example, if the information on the service status is changed to "not available" from "available", the NAN proxy server can stop providing a proxy service to the NAN proxy client.

And, for example, if the NAN proxy server receives ID (service_ID) information on a service, the NAN proxy server can perform a proxy service based on an ID value which is changed within a TTL range.

As a further different example, if the NAN proxy server receives information on a NAN interface address, the NAN proxy server can perform a proxy service based on an address value which is changed within a TTL range.

In particular, the NAN proxy client can release the registration registered at the NAN proxy server based on various reasons, by which the present invention may be non-limited.

In this case, for example, FIG. 13 may correspond to an embodiment for a case that the NAN proxy client releases the registration from the NAN proxy server.

More specifically, when the NAN proxy client 1330 intends to release the registration from the NAN proxy server 1320, the service/application layer of the NAN proxy client 1330 calls a method and provides the method to the NAN DE and NAN MAC layers. In this case, for example, it may use a legacy follow-up transmit method format for the called method. And, for example, the method may correspond to a newly defined proxy deregistration method. In particular, it may be able to call a method for releasing a proxy registration, by which the present invention may be non-limited.

In this case, the follow-up transmit method can be represented as Table 13 in the following. And, when a method is newly defined, a proxy deregistration method can be represented as Table 14 in the following. In this case, for example, the method can include information on an ID, and the like.

And, for example, in case of using the legacy follow-up transmit method, registration_id and a proxy server address can be included in Service_specific_info. In particular, information necessary for releasing a proxy registration can be provided in a manner of being included in the Service_specific_info while a legacy format is used.

On the contrary, according to the newly defined proxy deregistration method, the registration_id and the proxy server address can be independently provided.

TABLE 13

| Transmit( handle, service_specific_info, configuration_parameters) |
| --- |
| - Handle: |
|    A valid publish_id or subscribe_id which has been originally returned by an instance of the Publish function or the Subscribe function respectively |
| - Service_specific_info: |
|    Sequence of values which are to be transmitted in the frame body |
| - Configuration_parameters |
|    ○ NAN Interface Address: |
|       MAC address of the NAN Device to which the frame is destined to |
|    ○ Requestor Instance ID: |
|       Identifier of the instance of the Publish function or the Subscribe function in the NAN Device to which the follow-up message is destined to |
|    ○ Priority: |
|       Requested relative priority of the transmissions |

TABLE 14

| DeRegistration ( handle, service_specific_info, configuration_parameters , registration_id, proxy_server_address) |
| --- |
| - Handle: |
|    A valid publish_id or subscribe_id which has been originally returned by an instance of the Publish function or the Subscribe function respectively |
| - Service_specific_info: |
|    Sequence of values which are to be transmitted in the frame body |
| - Configuration_parameters |
|    ○ NAN Interface Address: |
|       MAC address of the NAN Device to which the frame is destined to |
|    ○ Requestor Instance ID: |
|       Identifier of the instance of the Publish function or the Subscribe function in the NAN Device to which the follow-up message is destined to |
|    ○ Priority: |
|       Requested relative priority of the transmissions |
| - Registration_id : |
|    ID value received at the time of registering at proxy server |
| - Proxy Server Address : |
|    Address of proxy server |

Subsequently, the NAN proxy client 1330 can transit a follow-up message to the NAN proxy server 1320. In this case, the follow-up message may correspond to a follow-up proxy deregistration request message. In particular, the NAN proxy client 1330 can transmit a message for releasing proxy registration to the NAN proxy server 1320 based on a called method.

In this case, for example, a TLV field of the follow-up proxy deregistration request message can be represented as Table 15 in the following. In particular, the follow-up proxy deregistration request message can include information on a registered ID and information on a NAC address for the NAN proxy server. By doing so, the NAN proxy server can identify a registered NAN proxy client and can perform a proxy deregistration procedure.

TABLE 15

| Field | Size (Octets) | Value (Hex) | Description |
|---|---|---|---|
| Type | 1 | Variable | Type code of the Proxy Deregistration Request TLV |
| Length | 2 | Variable | Length of the Proxy Deregistration Request TLV (not including the Type and Length fields) |
| Registration ID | 1 | Variable | Indicates the Registration ID of requested service |
| MAC Address of proxy server | 6 | Variable | Indicates the MAC Address of Proxy server on a remote NAN Device |

Subsequently, the NAN proxy client 1330 can receive a follow-up message from the NAN proxy server 1320. In this case, the follow-up message may correspond to a follow-up proxy deregistration response message. In particular, the NAN proxy client 1330 can receive a message for releasing proxy registration from the NAN proxy server 1320 in response to the proxy registration request. In this case, a TLV field of the follow-up proxy deregistration response message can be represented as Table 16 in the following. In particular, the follow-up proxy deregistration response message can include information on a registered ID and information indicating whether or not registration release is accepted.

TABLE 16

| Field | Size (Octets) | Value (Hex) | Description |
|---|---|---|---|
| Type | 1 | Variable | Type code of the Proxy Deregistration Request TLV |
| Length | 2 | Variable | Length of the Proxy Deregistration Request TLV (not including the Type and Length fields) |
| Status indication | 1 | Variable | If set to 0, Proxy deregistration is accept, otherwise set to 1 is fail |
| Registration ID | 1 | Variable | Indicates the Registration ID of requested service |

Subsequently, the NAN DE and the NAN MAC layers of the NAN proxy client 1330 can provide a follow-up receive event to the service/application layer. In this case, for example, the follow-up receive can be represented as Table 17 in the following. And, for example, the NAN proxy client 1330 can complete a proxy registration release procedure without the follow-up receive event.

TABLE 17

Receive (peer_instance_id, service_specific_info, address )

- peer_instance_id:
    Identifier of the Publish function or the Subscribe function in the NAN Device from which this follow-up message was received.
- service_specific_info:
    Sequence of values which were decoded from the received frame
- Address:
    NAN Interface Address of the NAN Device from which the frame was received
- Receive_status:
    Receiving status of Follow-up message. In this case for proxy registration update response, receive_status means update status.

As a different example, the NAN proxy server 1320 can autonomously release a role of a proxy server. In this case, the NAN proxy server 1320 can transmit a proxy deregistration notification to the NAN proxy client 1330. In this case, for example, the proxy deregistration notification can be transmitted by unicast or broadcast, by which the present invention may be non-limited. In particular, if the NAN proxy server 1320 releases the role of the proxy server, a message for notifying the release can be transmitted to the NAN proxy client 1330. In this case, for example, a TLV field of the proxy deregistration notification can be represented as Table 18 in the following. In this case, the TLV field of the proxy deregistration notification can include information of a registered ID. By doing so, the NAN proxy client 1330 can identify the released NAN proxy server 1320 and can perform a proxy deregistration procedure.

TABLE 18

| Field | Size (Octets) | Value (Hex) | Description |
|---|---|---|---|
| Type | 1 | Variable | Type code of the Proxy Deregistration Request TLV |
| Length | 2 | Variable | Length of the Proxy Deregistration Request TLV (not including the Type and Length fields) |
| Registration ID | 1 | Variable | Indicates the Registration ID of requested service |

As a further different example, the NAN proxy client 1330 can request update information on a proxy service to the NAN proxy server 1320. If the NAN proxy client does not receive any response in response to the N number of update requests, although the NAN proxy client does not receive a proxy deregistration notification, the NAN proxy client can determine it as the NAN proxy server 1320 does not exist anymore. In this case, for example, the N may correspond to a predetermined count and may correspond to a changeable number. And, for example, it may be able to vendor-specifically define the N number of update requests. And, for example, the N number of update requests can be differently configured according to a service, by which the present invention may be non-limited.

Figure 14:
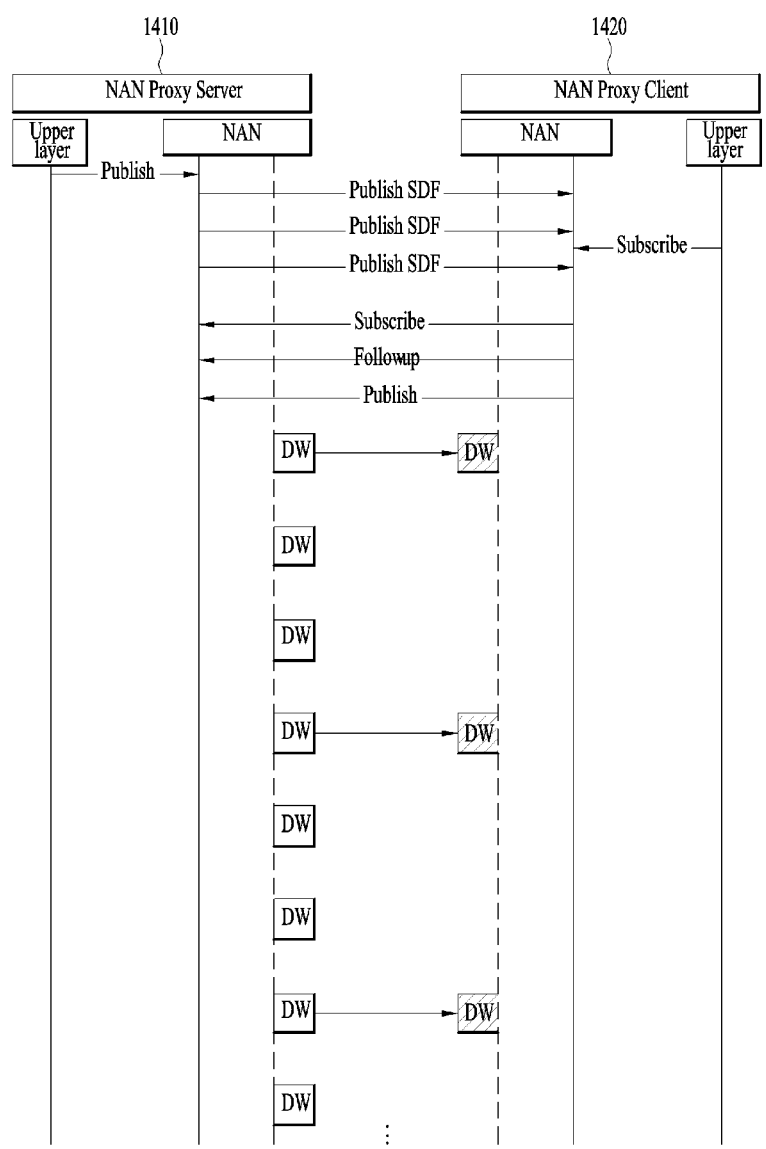
FIG. 14 is a diagram illustrating a discovery window period for a NAN proxy server and a NAN proxy client.

FIG. 14 is a diagram illustrating a discovery window period for a NAN proxy server and a NAN proxy client.

As mentioned in the foregoing description, it may be able to support a mechanism for performing data transmission of NAN terminals or reducing power consumption using the NAN proxy server. In this case, for example, when two NAN terminals are unable to perform communication due to a distance between the two NAN terminals, the terminals can perform communication using the NAN proxy server. And, since it is not necessary for a NAN proxy client to awake in every discovery window, it may be able to reduce power consumption.

In this case, the NAN terminal can perform a service discovery of the NAN proxy server by transmitting a subscribe message to the NAN proxy server. In this case, in order for the NAN terminal to transmit the subscribe message to the NAN proxy server, it is necessary to identify the NAN proxy server. In particular, it is necessary for the NAN terminal to check the existence of the NAN proxy server.

In this case, for example, the NAN proxy server can inform the NAN terminal of the existence of the NAN proxy server by publishing a service discovery frame by broadcasting the service discovery frame. In this case, for example, the publishing may correspond to a solicited type or an unsolicited type, by which the present invention may be non-limited.

For example, in order for the NAN proxy server to inform the NAN terminal of the capability of the NAN proxy server, the NAN proxy server can add a proxy server attribute within a NAN beacon frame or a service discovery frame. In this case, among NAN terminals, which have received the NAN beacon frame or the service discovery frame including the proxy server attribute, a terminal supporting a proxy client function interprets the proxy server attribute and may be then able to check the existence of the proxy server located near the terminal.

More specifically, Table 19 shows NAN attribute information capable of being included in the beacon frame and the service discovery frame. In this case, in Table 8, an attribute ID field can be defined by a different value to indicate a different attribute. And, for example, each of the attribute information may or may not be included in the beacon frame and the service discovery frame. And, for example, specific attribute information among the attribute information can be mandatorily included (represented by "M" in the table) in the beacon frame and the service discovery frame or can be optionally included (represented by "O" in the table) in the beacon frame and the service discovery frame.

In this case, it may be able to define at least one of a proxy server attribute field and a proxy client attribute field using a reserved bit belonging to the fields of the NAN attribute information. In this case, for example, the proxy server attribute field can be included in at least one selected from the group consisting of a NAN synchronization beacon frame, a NAN discovery beacon frame, and a NAN service discovery frame. In particular, the proxy server attribute field corresponds to a field defined by the NAN proxy server to notify the existence of the NAN proxy server. The proxy server attribute field can be selectively included in each of the frames.

On the contrary, the proxy client attribute field can be selectively included in the service discovery frame. In particular, the proxy client attribute field may correspond to information transmitted by a NAN terminal based on whether or not the NAN proxy server exists and whether or not the NAN terminal becomes a NAN proxy client. Hence, the proxy client attribute field is not transmitted to a NAN beacon frame and can be transmitted in a manner of being included in a NAN service discovery window.

TABLE 19

| Attribute ID | Description | NAN Beacons Sync | NAN Beacons Discovery | NAN SDF |
|---|---|---|---|---|
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN Infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |
| 14 (TBD) | Proxy Server Attribute | YES/O | YES/O | YES/O |
| 15 (TBD) | Proxy Client Attribute | NO | NO | YES/O |
| 16-220 | Reserved | NA | NA | NA |
| 221 | Vendor Specific Attribute | YES/O | YES/O | YES/O |
| 222-255 | Reserved | NA | NA | NA |

In this case, the proxy server attribute field can be configured as Table 20 in the following. More specifically, the proxy server attribute field can include a proxy server address field including address information of a NAN interface of a proxy server. And, the proxy server attribute field can include a proxy server capability field as information on capability of the NAN proxy server. In this case, a function of the NAN proxy server can be included in a bitmap form. And, an awake interval of the NAN proxy server can be represented by a value of an integer form. In this case, the integer value corresponds to a discovery window period during which the NAN proxy server is awaked. In particular, if the integer value corresponds to 1, the NAN proxy server can awake in every discovery window period. In this case, for example, since the NAN proxy server plays a role of the NAN proxy client on behalf of the NAN proxy client, it is preferable that the NAN proxy server awakes in every discovery window.

And, for example, if it is necessary to reduce power consumption of the NAN proxy server, it may change the integer value, by which the present invention may be non-limited. If the NAN proxy server provides a function of an AP STA at the same time, it may include a BSSID field as the AP STA.

TABLE 20

| Field | Size (Octets) | Value | Description |
|---|---|---|---|
| Attribute ID | 1 | 0x14 | Identifies the type of NAN attribute. (TBD) |
| Length | 2 | Variable | Length of the following fields in the attribute. |
| Proxy Server Address | 6 | Variable | NAN Interface address of NAN Proxy Server |
| Proxy Server Capability | 1 | Variable | Capability of Proxy Server |
| Awake Interval | 1 | 1-255 | DW interval of this Proxy Server |
| BSSID | 6 | Variable | BSSID which is support by Proxy Service if capable. |

And, a bitmap for the proxy server capability field can be represented as Table 21 in the following. More specifically, a publish proxy bit of the proxy server capability bitmap can indicate whether or not the NAN proxy server is able to transmit a service publish, which is proxied by receiving a publish request from a neighboring NAN terminal.

And, a subscribe proxy bit can indicate whether or not the NAN proxy server searches for a neighboring service by receiving a subscribe request from a neighboring NAN terminal and whether or not the NAN proxy server informs a NAN terminal of the searched service. And, a follow-up proxy bit can indicate whether or not a function of proxying a follow-up service discovery window of a neighboring NAN terminal is available. And, an invite proxy bit indicates whether or not a function of asking neighboring NAN terminals to participate in BSS of an AP STA of the NAN proxy server is available. And, a NAN data path can indicate whether or not the NAN proxy server supports a NAN data path function. And a NAN data forwarding bit can indicate whether or not a function of receiving a NAN data path from a NAN terminal and forwarding the NAN data path to neighboring NAN terminals is available. In particular, the proxy server capability field can indicate information on the functions capable of being performed by the NAN proxy server, by which the present invention may be non-limited.

TABLE 21

| Bit(s) | Information | Notes |
|---|---|---|
| 0 | Publish Proxy | Publish Proxy bit shall be set, if a Proxy server supports proxy a Publish request form Proxy client, and is set to 0 otherwise. |
| 1 | Subscribe Proxy | Subscribe Proxy bit shall be set, if a Proxy server supports proxy a Subscribe request form Proxy client, and is set to 0 otherwise. |
| 2 | Follow-up Proxy | Follow-up Proxy bit shall be set, if a Proxy server supports proxy a Follow-up request form Proxy client, and is set to 0 otherwise. |
| 3 | Invite Proxy | Follow-up Proxy bit shall be set, if a Proxy server supports to invite other NAN device to its own BSS, and is set to 0 otherwise. |
| 4 | NAN Data Path | NAN Data Path bit shall be set, if a Proxy server supports NAN data path capability, and is set to 0 otherwise. |
| 5 | NAN Data Forwarding | NAN Data Forwarding bit shall be set, if a Proxy server supports NAN data forwarding from a NAN device to other, and is set to 0 otherwise |
| 6-7 | Reserved | — |

For example, Table 22 in the following shows a format of a proxy client attribute. More specifically, the proxy client attribute can be included in a service discovery frame transmitted to the NAN proxy server by a NAN proxy client. In this case, for example, proxy client address corresponding to a NAN interface address of the NAN proxy client can be included in the proxy client attribute. And, proxy server address corresponding to a NAN interface address of the NAN proxy server can be included in the proxy client attribute. And, awake interval corresponding to an awake interval of a discovery window can be included in the proxy client attribute. In this case, the awake interval can indicate an awake interval of the NAN client in a unit of a discovery interval after the NAN proxy client requests publish, subscribe, and follow-up to the NAN proxy server.

For example, referring to FIG. 14, the NAN proxy client requests publish to the NAN proxy server and the awake interval of the proxy client attribute can be set to 3. In this case, the NAN proxy client can awake in every 3 discovery windows after being registered at the NAN proxy server. In particular, the NAN proxy client can awake in a first discovery window, a fourth discovery window, and a seventh discovery window. And, the NAN proxy client can awake with the same interval. Subsequently, if it is necessary for NAN proxy client to connect with the NAN proxy server, as mentioned in the foregoing description, the NAN proxy client can transmit a subscribe message to the NAN proxy server.

In this case, an awake interval of a discovery window can be determined according to characteristic or definition of the NAN proxy client. In this case, for example, it may be able to define a proxy server address and DW awake interval in addition to a legacy publish. By doing so, the NAN proxy client may leave a publish role of the NAN proxy client to the NAN proxy server. In particular, the NAN proxy client awakes in a discovery window of a specific interval only and matches synchronization with the NAN proxy server, thereby reducing power consumption.

In this case, for example, the NAN proxy server may always awake with a multiple of an awake interval of the NAN proxy client. In particular, the NAN proxy client can awake in a discovery window of a prescribed interval only based on an awake interval. And, the NAN proxy server may always awake in the discovery window in which the NAN proxy client awakes to exchange data with the NAN proxy client. By doing so, the NAN proxy client can perform data communication with other terminals while reducing power consumption using the NAN proxy server.

TABLE 22

| Field | Size (Octets) | Value | Description |
|---|---|---|---|
| Attribute ID | 1 | 0x15 | Identifies the type of NAN attribute. (TBD) |
| Length | 2 | Variable | Length of the following fields in the attribute. |
| Proxy Client Address | 6 | Variable | NAN Interface address of NAN device |
| Proxy Server Address | 6 | Variable | NAN Interface address of target NAN Proxy server |
| Awake Interval | 1 | Variable | Wake up interval of this Proxy Client (unit of DW interval) |
| BSSID | 6 | Variable | BSSID which is support by Proxy Service |

As mentioned in the foregoing description, a NAN proxy server can perform a procedure for performing communication on behalf of a NAN proxy client.

In this case, for example, it may perform discovery on an operation performed between the NAN proxy server and a different NAN terminal based on publish/subscribe. And, it may also perform discovery on the operation performed between the NAN proxy server and the different NAN terminal based on passive/active. In this case, a method of performing the discovery in consideration of each status is explained in the following.

A NAN proxy server can perform discovery based on an unsolicited publish type. In this case, the NAN proxy server can periodically publish a service discovery frame. In this case, a publish type may correspond to an unsolicited type. In particular, a different NAN terminal may not send a separate response after a published service discovery frame is received from the NAN proxy server. And, information on the registered NAN proxy client can be included in the service discovery frame. Subsequently, having received the service discovery frame, the NAN terminal can check whether or not a service of the NAN proxy client included in the service discovery frame corresponds to a service preferred by the NAN terminal. In this case, for example, the NAN terminal can directly perform service matching based on information on the service included in the service discovery frame. By doing so, the NAN terminal can check whether or not a service corresponds to a service preferred by the NAN terminal. Subsequently, when the NAN terminal performs communication with the NAN proxy client, the NAN terminal can establish a session with the NAN proxy client to perform direct communication with the NAN proxy client. In this case, for example, the NAN terminal can obtain information on a discovery window period during which the NAN proxy client is awaked via a service discovery frame. In this case, the NAN terminal awakes in the discovery window in which the NAN proxy client is awaked and can establish a direct session with the NAN proxy client.

In particular, the unsolicited publish type may correspond to a type capable of establishing a session with the NAN proxy client via direct service matching without a separate response after the NAN terminal receives a service discovery frame from the NAN proxy server.

And, the NAN proxy server can perform discovery based on a solicited publish type. In this case, when the NAN terminal intends to search for a NAN proxy client having a service preferred by the NAN terminal, the NAN terminal can actively subscribe to the NAN proxy server. In this case, a subscribe type may correspond to a solicited type. In particular, the NAN terminal can transmit a subscribe message to the NAN proxy server. In this case, for example, the subscribe message can include device service attribute information corresponding to information on the service preferred by the NAN terminal. In this case, for example, the device service attribute information can be represented as Table 23 in the following.

TABLE 23

| Device Service Attribute |
| --- |
| Attribute ID |
| Device ID |
| Instance ID |
| MAC interface |
| Publish mode |
| Subscribe mode |
| Service info |

Subsequently, the NAN proxy server can determine whether or not information of the registered NAN proxy client is identical to the service included in the subscribe message. In this case, if the information of the registered NAN proxy client is identical to the service included in the subscribe message, the NAN proxy server can publish a service discovery frame again. In this case, for example, service descriptor attribute information and NAN connection capability attribute information can be additionally included in the service discovery frame. In particular, additional information can be included in the service discovery frame to make the NAN terminal establish a session with the registered NAN proxy client.

Subsequently, the NAN terminal awakes in a discovery window in which the NAN proxy client is awaked to establish a direct session with the NAN proxy client.

In particular, according to the solicited publish type, the NAN terminal transmits a subscribe message of a solicited type to the NAN proxy server, receives a response from the NAN proxy server, and establish a session with the NAN proxy client.

And, discovery can be performed based on a passive subscribe type on the basis of a NAN proxy server.

More specifically, when a NAN terminal intends to search for a NAN proxy client having a service preferred by the NAN terminal, the NAN terminal can actively subscribe to a NAN proxy server. In this case, a subscribe type may correspond to an unsolicited type. In particular, the NAN terminal can transmit a subscribe message to the NAN proxy server. In this case, for example, the subscribe message can include device service attribute information corresponding to information on the service preferred by the NAN terminal.

In this case, for example, the device service attribute information can be represented as Table 23 mentioned above. In this case, since the subscribe type corresponds to the unsolicited type, the NAN proxy server may not publish a separate service discovery frame to the NAN terminal. In this case, for example, the NAN proxy server can wait for a discovery window in which the NAN proxy client is awaked. Subsequently, the NAN proxy server can transmit a service discovery frame to the NAN proxy client in the discovery window in which the NAN proxy client is awaked by publishing the service discovery frame. In this case, the publish type may correspond to an unsolicited type. In this case, device service attribute information received from the NAN terminal can be included in the service discovery frame. In this case, for example, if the NAN proxy client receives a publish message, the NAN proxy client can awake in every discovery window. Subsequently, the NAN proxy client can establish a session with the NAN terminal.

In particular, according to the passive subscribe type, the NAN proxy server receives information on a service from the NAN terminal, delivers the information to the NAN proxy client, and establishes a session with the NAN terminal and the NAN proxy client.

And, discovery can be performed based on an active subscribe type on the basis of a NAN proxy server.

More specifically, a NAN proxy server can publish a service discovery frame to a NAN terminal on behalf of a NAN proxy client. In this case, information on the NAN proxy client can be included in a publish message. Subsequently, the NAN proxy server can receive a subscribe message including device service attribute information from the NAN terminal.

In this case, the device service attribute information can be represented as Table 23 mentioned above. Subsequently, the NAN proxy server can publish a service discovery frame to the NAN proxy client. Subsequently, the NAN proxy client can establish a session with the NAN terminal. In particular, according to the active subscribe type, on behalf of the NAN proxy client, the NAN proxy server provides information on a service to the NAN terminal and receives a response from the NAN terminal. Subsequently, as mentioned in the foregoing description, the NAN proxy server can deliver information received from the NAN terminal to the NAN proxy client.

As mentioned in the foregoing description, when a NAN proxy server provides a proxy service on behalf of a NAN proxy client, the proxy service can be differently provided based on solicited/unsolicited or active/passive.

In this case, for example, in case of providing a proxy service, the NAN proxy client can transmit relevant information to the NAN proxy server in a form of a service discovery frame. In this case, for example, a sub type of the service discovery frame can be represented as Table 24 in the following based on the aforementioned types, by which the present invention may be non-limited. And, for example, the aforementioned information can be exchanged in a discovery window or a FAW (further available window), by which the present invention may be non-limited.

TABLE 24

| Service Discovery Frame Subtype |
| --- |
| Proxied_publish_unsolicited_Tx_only |
| Proxied_publish_solicited_Tx_only |
| Proxied_publish_both |
| Proxied_subscribe_passive |
| Proxied_subscribe_active |

Figure 15:
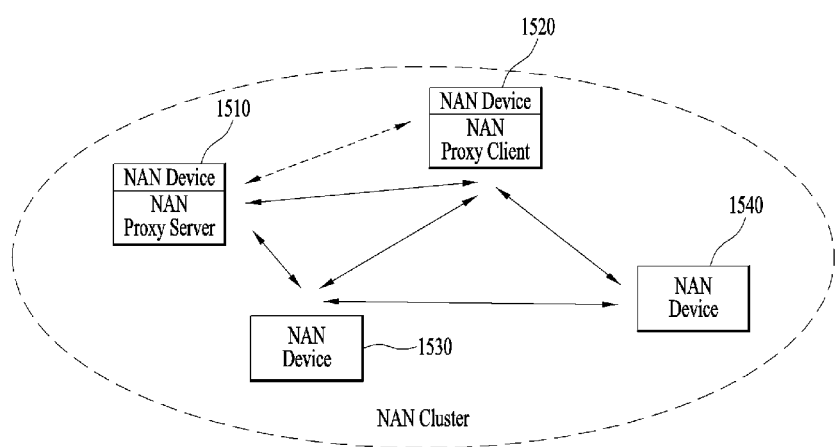
FIG. 15 is a diagram illustrating operations of a NAN proxy server and a NAN proxy client in a cluster.

FIG. 15 is a diagram illustrating operations of a NAN proxy server and a NAN proxy client in a cluster.

As mentioned in the foregoing description, a NAN proxy server 1510 can perform a communication procedure for a service on behalf of a NAN proxy client 1520.

As mentioned earlier in FIG. 7 and Table 1, NAN terminals can form a cluster and may have various roles and states. In this case, if a NAN terminal becomes the NAN proxy server 1510 or the NAN proxy client 1520, whether to maintain a role and a state of the NAN terminal may cause a problem.

In the following description, when the NAN terminal becomes the NAN proxy server 1510 or the NAN proxy client 1520, a method of configuring a role and a state is explained.

In particular, when the NAN proxy server 1510 and the NAN proxy client 1520 are configured in the same cluster, a method of configuring a role and a state is explained.

The NAN proxy server 1510 can awake in every discovery window to perform a function of the NAN proxy client 1520 on behalf of the NAN proxy client. In this case, the NAN proxy server 1510 can transmit a synchronization beacon frame in every discovery window. By doing so, the NAN proxy server 1510 can match synchronization with the NAN proxy client 1520. In this case, according to Table, in order for the NAN proxy server 1510 to transmit a synchronization beacon frame in every discovery window, the NAN proxy server 1510 should maintain a master state or a non-master sync state.

In this case, for example, referring to FIG. 15, since the NAN proxy server 1510 also corresponds to a NAN terminal included in a NAN cluster, the NAN proxy server can operate based on the aforementioned anchor master selection algorithm. In this case, when the aforementioned state transition method is applied to the NAN terminal, since the NAN proxy server 1510 transmits a synchronization beacon frame in every discovery window, the NAN proxy server 1510 may not transit to the non-master non-synch state.

In this case, for example, when a NAN terminal becomes the NAN proxy server 1510, HC and AMBTT can be updated only while the state transition method is not applied. In particular, among NAN terminals, a NAN terminal in the master state or the non-master sync state may become the NAN proxy server 1510. In this case, the NAN proxy server 1510 may maintain one of the legacy master state and the non-master sync state. By doing so, the NAN proxy server 1510 can consistently provide a proxy service on behalf of the NAN proxy client 1520.

As a different example, when a NAN terminal becomes the NAN proxy server 1510, the state transition method can also be applied to the NAN proxy server 1510. Yet, as mentioned in the foregoing description, since the NAN proxy server 1510 transmits a synchronization beacon frame in every discovery window in a manner of being awaked in every discovery window, a state transition can be performed between the master state and the non-master sync state only. In particular, although the NAN proxy server 1510 can perform a state transition between the master state and the non-master sync state, the NAN proxy server 1510 is unable to switch to the non-master non-sync state. In this case, the HC and the AMBTT can be identically updated.

As a further different example, if a NAN terminal in the non-master non-sync state becomes the NAN proxy server 1510, the NAN proxy server 1510 may switch to the master state or the non-master sync state.

As a further different example, if a NAN terminal becomes the NAN proxy server 1510, as mentioned in the foregoing description, the NAN proxy server 1510 can transmit a synchronization beacon frame.

In this case, the NAN proxy server 1510 can transmit a synchronization beacon frame at specific timing of a discovery window. For example, the NAN proxy server 1510 can transmit the synchronization beacon frame in the middle of the discovery window. More specifically, the NAN proxy client 1520 deputes the proxy server 1510 to perform a proxy service and may not awake in every discovery window. In this case, for example, the NAN proxy client 1520 may awake in a specific discovery window based on an awake period. In particular, the NAN proxy client 1520 may maintain a sleep state for a long time. In this case, since the NAN proxy client 1520 maintains the sleep state for a long time, time synchronization of the discovery window in which the NAN proxy client 1520 is awaked may be faster or slower than reference timing. In particular, synchronization timing may be far from a reference value. Hence, the NAN proxy server 1510 can transmit the synchronization beacon frame in the middle of the discovery window to have sufficient time for performing synchronization with the NAN proxy client 1520. By doing so, possibility of performing synchronization with the NAN proxy client 1520 can be enhanced. And, possibility of performing synchronization with a different NAN terminal 1540 by the NAN proxy server can be enhanced.

As a further different example, the NAN proxy server 1510 can transmit a synchronization beacon frame based on a back-off value determined by an HC value in a discovery window. Subsequently, the NAN proxy server 1510 can transmit a synchronization beacon frame one more time at different timing in the same discovery window. In particular, the NAN proxy server 1510 can transmit a synchronization beacon frame several times in the same discovery window. By doing so, it may be able to increase possibility of the NAN proxy server 1510 that performs synchronization with the NAN proxy client 1520 or a different NAN terminal 1540.

As a further different example, the NAN proxy client 1520 can also be included in a NAN cluster. In this case, the NAN proxy client 1520 can operate based on an anchor master selection algorithm. And, the NAN proxy client 1520 can also operate based on the aforementioned state transition method.

As mentioned in the foregoing description, the NAN proxy client 1510 may depute the NAN proxy server 1510 to perform a proxy service to reduce power consumption of the NAN proxy client. In particular, if a NAN terminal becomes the NAN proxy client 1520, the NAN proxy client 1520 may switch to a non-master non-sync state. In particular, the NAN proxy client 1520 can switch to the non-master non-sync state based on the purpose of reducing power consumption.

In this case, a discovery window of a NAN cluster may operate based on 16 discovery windows including DW0 to DW15. In particular, the 16 discovery windows may operate as a single period in the NAN cluster. In this case, for example, all NAN terminals belonging to the NAN cluster may awake in the DW0. In particular, both the NAN proxy client 1520 and the NAN proxy server 1510 belonging to the NAN cluster may awake in the DW0. Hence, the NAN proxy client 1520 awakes in the DW0 and may be then able to perform synchronization with the NAN proxy server 1510. And, in order for the NAN proxy client 1520 to receive information on a service from the NAN proxy server 1510, the NAN proxy client 1520 may awake in a specific discovery window. In this case, period information of the discovery window in which the NAN proxy client is awaked can be determined via negotiation between the NAN proxy server 1510 and the NAN proxy client 1520.

And, for example, the NAN proxy server 1510 can provide information on the discovery window in which the NAN proxy client is awaked. By doing so, the NAN proxy client 1520 can awake in a specific discovery window. In this case, for example, a discovery window period may vary according to each of the NAN proxy clients 1520.

For example, a plurality of NAN proxy clients can be configured in a NAN cluster. In this case, a discovery window in which each of a plurality of the NAN proxy clients is awaked can be differently configured. In particular, the NAN proxy server 1510 can configure a discovery window period with each of a plurality of the NAN proxy clients.

And, for example, a discovery window in which the NAN proxy client 1520 is awaked can be configured by a multiple of N on the basis of a discovery window. In this case, for example, information on the discovery window may have a form based on equation 2 or 3 in the following.

$$\text{Awake DW}=\text{AMBTT}+N*512 \text{ Tus} \quad \text{[Equation 2]}$$

$$\text{Awake DW}=\text{TSF Timer}+N*512 \text{ Tus} \quad \text{[Equation 3]}$$

As a further different example, if a NAN terminal becomes the NAN proxy client 1520, the NAN proxy client 1520 may switch to a sleep state as a new state. In particular, it may define a new state when the NAN proxy server 1510 and the NAN proxy client 1520 are configured. In this case, for example, although the NAN proxy client 1520 belongs to a NAN cluster, the NAN proxy client 1520 may not awake in the DW0. In this case, for example, the NAN proxy client 1520 can configure a period of a discovery window in which the NAN proxy client is awaked by negotiating the period with the NAN proxy server 1510. In particular, as shown in Table 25, the NAN proxy client 1520 can switch to a state newly defined in the NAN cluster.

TABLE 25

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

As a further different example, a state transition can be performed when a NAN terminal becomes the NAN proxy client 1520 based on a current status of the NAN terminal.

More specifically, for example, a NAN terminal corresponding to an anchor master may become the NAN proxy client 1520. In this case, for example, the NAN terminal can transmit a value HC=0 to the NAN proxy server 1510 in a manner of including the value in attribute information of a service discovery frame to indicate that the NAN terminal corresponds to the anchor master. In particular, the NAN terminal can inform the NAN proxy server 1510 that the NAN terminal corresponds to the anchor master.

As a further different example, it may be able to check a NAN interface address of a NAN proxy client of a service discovery frame through a NAN interface and an HC value obtained by the NAN proxy server 1510 through a synchronization beacon frame. By doing so, the NAN proxy server 1510 can check whether or not the NAN proxy client 1520 corresponds to the anchor master. In this case, for example, if the NAN proxy server 1510 receives a service discovery frame, the NAN proxy server 1510 may become the anchor master. In this case, the NAN proxy server 1510 can configure a master rank of the NAN proxy server to be identical to an anchor master rank value. And, current/last anchor master record can also be updated based on a case that the NAN proxy server becomes the anchor master. In this case, for example, the NAN proxy client 1520 can switch to a non-master non-sync state. And, for example, the NAN proxy client 1520 can switch to a newly defined sleep state.

As a further different example, a NAN terminal in a master state may become the NAN proxy client 1520. In this case, the NAN proxy client 1520 may add a parameter for Role and State to a frame transmitted to the NAN proxy server. In particular, the NAN proxy client 1520 can transmit relevant information to the NAN proxy server 1510 to indicate that the NAN proxy client corresponds to a master. In this case, for example, the NAN proxy client 1520 can transmit a service discovery frame in a manner of including a parameter for a state in the service discovery frame. And, for example, the NAN proxy client 1520 can transmit a parameter for a state as attribute information of the service discovery frame, by which the present invention may be non-limited.

In this case, for example, if a NAN terminal becomes the NAN proxy client 1520, the NAN proxy client 1520 can switch to a non-master non-sync state. And, for example, the NAN proxy client 1520 can switch to a sleep state as a new state. And, for example, the NAN proxy client 1520 can perform negotiation with the NAN proxy server 1510 in relation to the non-master non-sync state and the sleep state. Subsequently, the NAN proxy client 1520 can depute the NAN proxy server 1510 to perform a proxy service.

As a further different example, a non-master non-sync NAN terminal may become the NAN proxy client 1520. In this case, if the NAN proxy client 1520 does not negotiate an awake period and awake timing with the NAN proxy server 1510, the NAN proxy client can operate based on the legacy non-master non-sync state. And, for example, the NAN proxy client 1520 can switch to a new sleep state. In this case, the NAN proxy client 1520 can negotiate an awake period and awake timing with the NAN proxy server 1510, by which the present invention may be non-limited.

As a further different example, as mentioned in the foregoing description, the NAN proxy client 1520 may awake in a discovery window based on a prescribed period. In this case, when the NAN proxy client 1520 is awaked, the NAN proxy client 1520 can receive a synchronization beacon frame from the NAN proxy server 1510. In this case, the NAN proxy client 1520 can update a current/last AMR (anchor master rank).

And, for example, the NAN proxy client 1520 can receive a synchronization beacon frame from a different NAN terminal in a discovery window in which the NAN proxy client 1520 is awaked. In this case, the NAN proxy client 1520 can update a current/last AMR (anchor master rank). In particular, the NAN proxy client 1520 can receive a synchronization beacon frame and update information on a rank in the discovery window in which the NAN proxy client 1520 is awaked. In this case, the NAN proxy client 1520 may maintain a state without performing a state transition.

As a further different example, the NAN proxy client 1520 can perform a state transition between a non-master non-sync state and a sleep state in a discovery window in which the NAN proxy client 1520 is awaked. In this case, for example, the state transition can be performed via negotiation with the NAN proxy server 1510.

As a further different example, the NAN proxy client 1520 may fail to receive a synchronization beacon frame from the NAN proxy server 1510 in a discovery window in which the NAN proxy client 1520 is awaked. In this case, the NAN proxy client 1520 may awake in a next discovery window. In this case, the NAN proxy client 1520 can receive a synchronization beacon frame from the NAN proxy server 1510 in the next discovery window. The NAN proxy client 1520 may fails to receive a synchronization beacon frame again. In this case, the NAN proxy client 1520 may awake in a next discovery window. In this case, the NAN proxy client 1520 may fail to receive a synchronization beacon frame from the NAN proxy server 1510 in three contiguous discovery windows. In this case, for example, the NAN proxy client 1520 can receive a synchronization beacon frame from a different NAN terminal. In this case, the NAN proxy client 1520 can release the registration from the NAN proxy server 1510 and switch to an awake state. In this case, the NAN proxy client 1520 may operate based on an anchor master selection algorithm and a state transition algorithm in a manner of being awaked. In particular, the NAN proxy client 1520 terminates a proxy service and may operate as a legacy NAN terminal.

As a further different example, if the NAN proxy client 1520 fails to receive a synchronization beacon frame from a different NAN terminal, the NAN proxy client 1520 itself may become an anchor master or generate a new cluster, by which the present invention may be non-limited.

As a further different example, if the NAN proxy client 1520 fails to receive a synchronization beacon frame from the NAN proxy server 1510 in a discovery window in which the NAN proxy client 1520 is awaked, the NAN proxy client 1520 immediately releases the registration and may operate as a legacy NAN terminal.

And, if the NAN proxy client 1520 fails to receive a synchronization beacon frame from the NAN proxy server 1510 and a different NAN terminal, the NAN proxy client 1520 may become an anchor master or operate as a legacy NAN terminal, by which the present invention may be non-limited.

Figure 16:
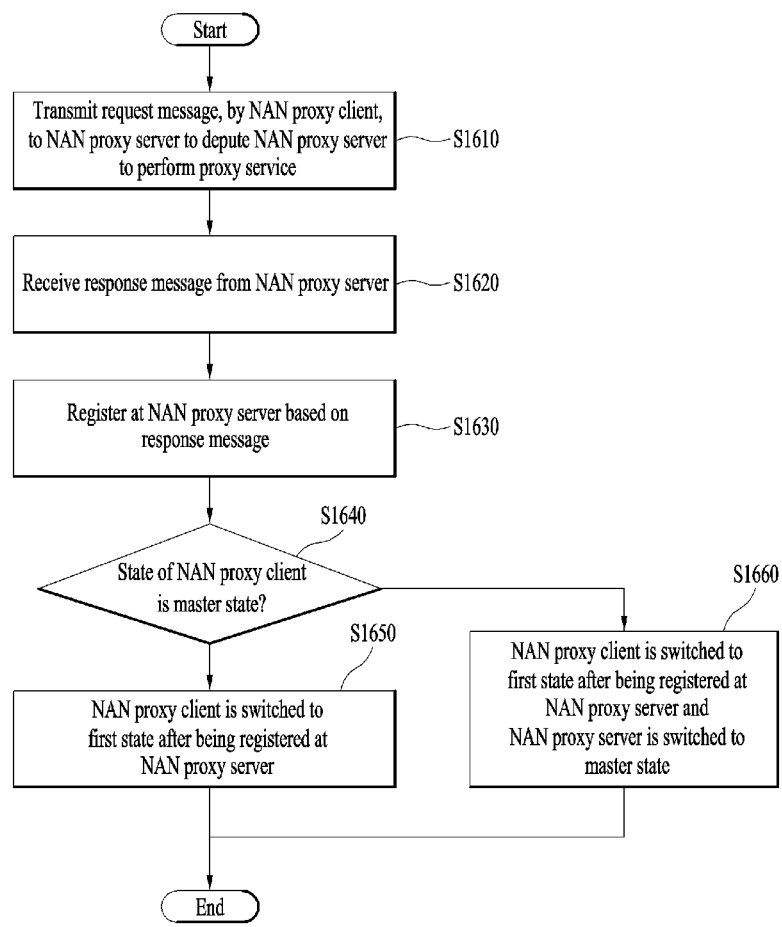
FIG. 16 is a flowchart of a method for a NAN proxy client to transit a state.

FIG. 16 is a flowchart of a method for a NAN proxy client to transit a state.

The NAN proxy client can transmit a request message to the NAN proxy server to depute the proxy server to perform a proxy service [S1610]. In this case, as mentioned earlier in FIGS. 10 to 15, the NAN proxy server can perform a function of the NAN proxy client on behalf of the NAN proxy client. For example, as mentioned in the foregoing description, the NAN proxy server can perform a publish/subscribe function on behalf of the NAN proxy client. In this case, for example, the NAN proxy client can depute the NAN proxy server to perform a specific service.

Subsequently, the NAN proxy client can receive a response message form the NAN proxy server [S1620]. Subsequently, the NAN proxy client can register at the NAN proxy server based on the received response message [S1630]. In this case, as mentioned earlier in FIGS. 10 to 15, the NAN proxy client and the NAN proxy server can exchange information on a service via the aforementioned procedure. And, the NAN proxy client and the NAN proxy server can exchange information on a period of a discovery window in which the NAN proxy client is awaked and information on a service deputed by the NAN proxy client via the aforementioned procedure.

Subsequently, the NAN proxy client can switch a state after being registered at the NAN proxy server. In this case, the state of the NAN proxy client and a state of the NAN proxy server can be differently switched according to whether or not the state of the NAN proxy client corresponds to a master state [S1640]. In this case, if the state of the NAN proxy client corresponds to the master state before the NAN proxy client is registered at the NAN proxy server, the NAN proxy client can switch to a first state after being registered at the NAN proxy server. And, the NAN proxy server can switch to the master state [S1650]. In this case, as mentioned earlier in FIGS. 10 to 15, the first state may correspond to a non-master non-sync state. Or, the first state may correspond to a sleep state. In particular, the NAN proxy client can switch to the first state after being registered at the NAN proxy server to reduce power consumption. In this case, if the NAN proxy client is in the master state, the NAN proxy client can inform the NAN proxy server of information on the master state. In this case, the NAN proxy server may become the master state on behalf of the NAN proxy client. And, if the NAN proxy client is in the anchor master state, the NAN proxy client can inform the NAN proxy server of information on the anchor master state. In this case, the NAN proxy server may become the anchor master state on behalf of the NAN proxy client.

On the contrary, if the state of the NAN proxy client is not the master state (non-master sync or non-master non-sync state) before the NAN proxy client is registered at the NAN proxy server, the NAN proxy client can switch to a first state after being registered at the NAN proxy server [S1660]. In this case, as mentioned earlier in FIGS. 10 to 15, the first state may correspond to a non-master non-sync state. Or, the first state may correspond to a sleep state. In particular, the NAN proxy client can switch to the first state after being registered at the NAN proxy server to reduce power consumption. In this case, if the NAN proxy client is not in the master state, the NAN proxy server can maintain a previous state. Yet, the NAN proxy server may awake in every discovery window and stay in the master state or the non-master state to transmit a synchronization beacon frame.

In particular, a state of the NAN proxy server can be changed according to a state of the NAN proxy client before the NAN proxy client is registered at the NAN proxy server, by which the present invention may be non-limited.

Figure 17:
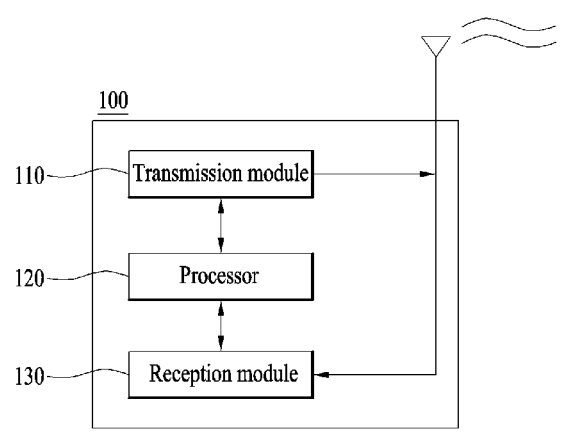
FIG. 17 is a block diagram for a terminal device.

FIG. 17 is a block diagram for a terminal device.

A terminal device may correspond to a NAN terminal. In this case, for example, the NAN terminal may correspond to a terminal playing a role of a NAN proxy server. And, the NAN terminal may correspond to a terminal playing a role of a NAN proxy client. And, the NAN terminal may correspond to a terminal performing discovery with the NAN proxy server.

In this case, the terminal device 100 can include a transmission module 110 configured to transmit a radio signal, a reception module 130 configured to receive a radio signal, and a processor 120 configured to control the transmission module 110 and the reception module 130. In this case, the terminal 100 can perform communication with an external device using the transmission module 110 and the reception module 130. In this case, the external device may correspond to a different terminal device. And, the external device may correspond to a base station. In particular, the external device may correspond to a device capable of performing communication with the terminal device 100, by which the present invention may be non-limited. The terminal device 100 can transmit and receive digital data such as contents using the transmission module 110 and the reception module 130. And, the terminal device 100 can exchange a beacon frame, a service discovery frame, and the like using the transmission module 110 and the reception module 130, by which the present invention may be non-limited. In particular, the terminal device 100 performs communication using the transmission module 110 and the reception module 130 and may be able to exchange information with an external device.

According to one embodiment of the present specification, the processor 120 of the terminal device 100 can transmit a request message to the NAN proxy server using the transmission module 110 to depute the NAN proxy server to perform a proxy service. In this case, the request message can include information on the proxy service and information on the NAN proxy client, by which the present invention may be non-limited.

And, the processor 120 can receive a response message from the NAN proxy server using the reception module 130. In this case, the processor 120 can perform registration registered at the NAN proxy server based on the response message. Subsequently, the processor 120 can perform a state transition. In this case, the processor 120 can switch to a non-master non-sync state or a sleep state as a first state.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

Although the present invention is explained under the assumption that the present invention is applied to a NAN wireless communication system, by which the present invention may be non-limited. The present invention can be applied to various wireless systems using the same scheme.

What is claimed is:

1. A method of performing a state transition performed by a neighbor awareness networking (NAN) proxy client in a wireless communication system, the method comprising:
    transmitting a request message, by the NAN proxy client, to a NAN proxy server to depute the NAN proxy server to perform a proxy service;
    receiving a response message from the NAN proxy server;
    registering at the NAN proxy server based on the response message; and
    after the registering at the NAN proxy server, transiting a state of the NAN proxy client to either a non-master non-sync state or a sleep state,
    wherein when the NAN proxy client is switched to the non-master non-sync state, the NAN proxy client awakes at a first discovery window and a predetermined discovery window, included in a first discovery window related to the NAN proxy client,
    wherein when the NAN proxy client is switched to the sleep state, the NAN proxy client awakes at the predetermined discovery window, included only in the first discovery window related to the NAN proxy client.

2. The method of claim 1,
    wherein a NAN proxy cluster and the NAN proxy server belong to the same NAN cluster, and
    wherein NAN terminals belonging to the same NAN cluster operate based on the first discovery window related to the NAN proxy client.

3. The method of claim 1,
    wherein the state of the NAN proxy client before being registered at the NAN proxy server corresponds to a second state.

4. The method of claim 3,
    wherein the second state corresponds to one selected from a group consisting of a master state, a non-master sync state, and a non-master non-sync state.

5. The method of claim 4,
    wherein the NAN proxy client transmits the request message, to the NAN proxy server, which includes information on the second state of the NAN proxy client in the request message.

6. The method of claim 5,
    wherein when the second state corresponds to the master state and when the NAN proxy client registers at the NAN proxy server, the NAN proxy server is switched to the master state.

7. The method of claim 1,
    wherein the NAN proxy server awakes for every discovery window and transmits a synchronization beacon frame in each of the every discovery window.

8. The method of claim 7,
    wherein the NAN proxy server is in either a master state or a non-master sync state.

9. A neighbor awareness networking (NAN) proxy client performing a state transition in a wireless communication system, the NAN proxy client comprising:
    a receiver;
    a transmitter; and
    a processor, operatively coupled to the receiver and transmitter, wherein the processor is configured to:
    control the transmitter to transmit a request message to a NAN proxy server to depute the NAN proxy server to perform a proxy service, control the receiver to receive a response message from the NAN proxy server, register at the NAN proxy server based on the response message, and perform a state transition of the NAN proxy client to either a non-master non-sync state or a sleep state, after the registration at the NAN proxy server, wherein when the NAN proxy client is switched to the non-master non-sync state, the NAN proxy client awakes at a first discovery window and a predetermined discovery window, included in a first discovery window related to the NAN proxy client, wherein when the NAN proxy client is switched to the sleep state, the NAN proxy client awakes at the predetermined discovery window, included only in the first discovery window related to the NAN proxy client.

10. The NAN proxy client of claim 9, wherein a NAN proxy cluster and the NAN proxy server belong to the same NAN cluster, and wherein NAN terminals belonging to the same NAN cluster operate based on the first discovery window related to the NAN proxy client.

* * * * *